US011465059B2

(12) United States Patent
George et al.

(10) Patent No.: US 11,465,059 B2
(45) Date of Patent: *Oct. 11, 2022

(54) NON-PLAYER GAME COMMUNICATION

(71) Applicant: Amazon Technologies, Inc., Seattle, WA (US)

(72) Inventors: Michael Martin George, Seattle, WA (US); Justin Michael George, Seattle, WA (US); Brian Oliver, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/200,605

(22) Filed: Mar. 12, 2021

(65) Prior Publication Data

US 2021/0197093 A1 Jul. 1, 2021

Related U.S. Application Data

(63) Continuation of application No. 16/457,563, filed on Jun. 28, 2019, now Pat. No. 10,946,292.

(51) Int. Cl.
| | |
|---|---|
| *A63F 13/86* | (2014.01) |
| *A63F 13/25* | (2014.01) |
| *A63F 13/87* | (2014.01) |
| *A63F 13/30* | (2014.01) |

(52) U.S. Cl.
CPC .............. *A63F 13/86* (2014.09); *A63F 13/25* (2014.09); *A63F 13/30* (2014.09); *A63F 13/87* (2014.09); *A63F 2300/537* (2013.01)

(58) Field of Classification Search
USPC ......................................................... 463/31
See application file for complete search history.

(56) References Cited

U.S. PATENT DOCUMENTS

| | | | |
|---|---|---|---|
| 10,946,292 B1 | 3/2021 | George et al. | |
| 2011/0107220 A1* | 5/2011 | Perlman | H04N 21/2381 |
| | | | 715/720 |
| 2016/0259408 A1* | 9/2016 | Messingher | G02B 27/0093 |
| 2017/0250004 A1 | 8/2017 | Ovalle | |
| 2017/0323703 A1 | 11/2017 | Ovalle | |
| 2018/0096752 A1 | 4/2018 | Ovalle | |
| 2018/0243650 A1* | 8/2018 | Baszucki | A63F 13/355 |
| 2018/0260025 A1* | 9/2018 | Messingher | G06F 3/0346 |
| 2019/0270011 A1 | 9/2019 | Rubenfield et al. | |
| 2019/0272156 A1 | 9/2019 | Rubenfield et al. | |
| 2020/0126353 A1 | 4/2020 | Ovalle | |
| 2020/0134975 A1 | 4/2020 | Alexander | |

\* cited by examiner

*Primary Examiner* — Pierre E Elisca
(74) *Attorney, Agent, or Firm* — Robert C. Kowert; Kowert, Hood, Munyon, Rankin & Goetzel, P.C.

(57) ABSTRACT

A system in which players participate as characters in a virtual game world via game clients executing on client devices. An observer mode is provided that enables users to navigate in the game world without requiring a game client so that a user can navigate the game world while not actively playing the game. When a user accesses the game in observer mode, a view of the game world is rendered from the viewpoint of an observer's character; the observer's character may not correspond to a character in the game and the observer's character may not be visible to the players in the game. The rendered view of the game world is streamed to a viewing application on a personal device. Navigation inputs allow the observer's character to move freely within the game world.

20 Claims, 25 Drawing Sheets

```
┌─────────────────────────────────────────────────────────────────────┐
│ A person enters an active game world as an observer via a viewing   │
│ application using navigation controls to select an initial location │
│ for the observer's character; the observer's character is not       │
│ visible to active players or to other characters.                   │
│                              1400                                    │
└─────────────────────────────────────────────────────────────────────┘
                                   │
                                   ▼  ◄──────────────────────────────┐
┌─────────────────────────────────────────────────────────────────┐  │
│ The observer moves about in the game world using the navigation │  │
│ controls to change the location of the observer's character in  │  │
│ the game world.                                                  │  │
│                          1410                                    │  │
└─────────────────────────────────────────────────────────────────┘  │
                                   │                                  │
                                   ▼                                  │
┌─────────────────────────────────────────────────────────────────┐  │
│ The game system renders and streams a view of the game world    │  │
│ from the current viewpoint of the observer's character as the   │  │
│ observer's character moves about in the game world              │  │
│                          1420                                    │  │
└─────────────────────────────────────────────────────────────────┘──┘
```

*FIG. 14A*

NON-PLAYER GAME COMMUNICATION

This application is a continuation of U.S. patent application Ser. No. 16/457,563, filed Jun. 28, 2019, which is hereby incorporated by reference herein its entirety.

BACKGROUND

Computer-based games have evolved from single-player game programs installed and executed on personal computers to include technologies that allow multiplayer gaming in which two or more players may simultaneously participate in a game session. For example, game consoles may host console-based multiplayer games that allow multiple players to simultaneously participate in a game session via separate controllers connected to the console. As another example, network-based multiplayer games, which may be referred to as online games, may allow multiple players to simultaneously participate in a game from consumer devices coupled to a network. Evolution of the Internet, Web-based computing, and mobile computing, including the increasingly widespread availability of broadband connections and the availability and capabilities of consumer computing devices including but not limited to mobile computing devices such as pad/tablet devices and smartphones, has led to continuing evolution and growth of multiplayer online gaming. Multiplayer games may include everything from relatively simple, two-dimensional (2D) casual games to more complex 2D or three-dimensional (3D) action or strategy games that may involve two or more players in a game session, to world-building multiplayer games, to complex 3D massively multiplayer online games (MMOGs) such as massively multiplayer online role-playing games (MMORPGs) that may simultaneously support hundreds or thousands of players in a persistent online "world".

BRIEF DESCRIPTION OF THE DRAWINGS

FIG. 14A is a flowchart of a method for viewing a game world in observer mode in a multiplayer game system, according to some embodiments.

Figure 1:
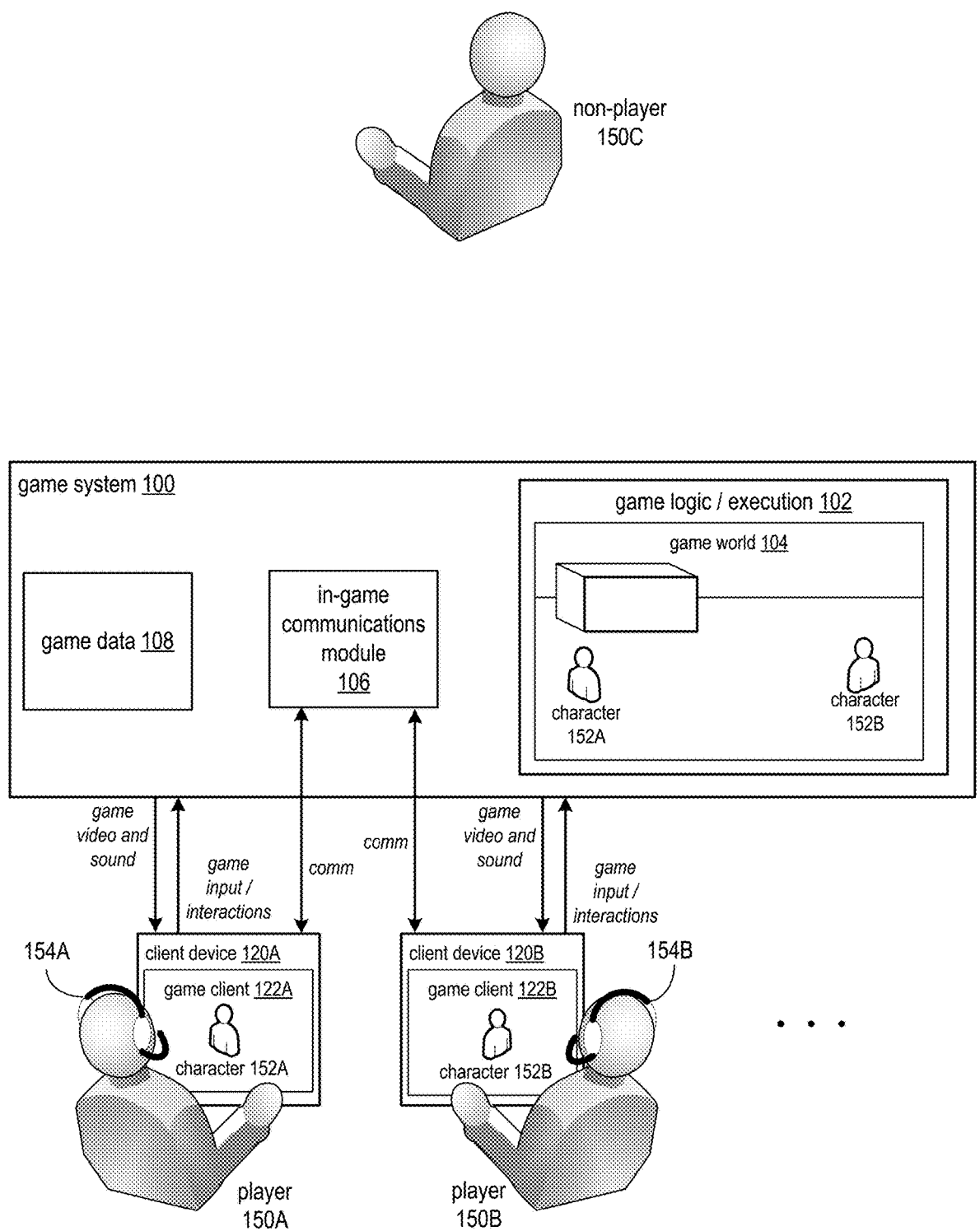
FIG. 1 illustrates in-game communications between players in a multiplayer game system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for out-of-band communications and for non-player game navigation in computer-based game systems including multiplayer game systems are described. Multiplayer game systems may include everything from relatively simple, two-dimensional (2D) casual games to more complex 2D or three-dimensional (3D) action or strategy games, to complex 3D massively multiplayer online games (MMOGs) such as massively multiplayer online role-playing games (MMORPGs) that may simultaneously support hundreds or thousands of players in a persistent online "world".

In at least some multiplayer games, active players may communicate via in-game communications channels. For example, some multiplayer games involve teams of players that compete against each other, and members of a team may communicate via voice or text using an in-game communications channel dedicated to that team. However, an active player may want to communicate with people that are not currently playing the game, for example a member of their team that is not currently logged on to the game on a client device (referred to as an inactive player or non-player). (Note that an inactive player may be anywhere, and thus may not have access to a client device that include a gaming client). Currently, this cannot be accomplished from within the game, and the active player either has to switch to another application on their client device (e.g., an email or text messaging application) or use another device (e.g., a cell phone) to contact the inactive player. It is also notable that this requires that the active player has the contact information for the inactive player. However, teams of players may be formed of strangers from different parts of the world, and people interested in playing a game typically do not wish to expose their personal contact information to strangers.

Embodiments of a messaging service are described that enable players within a game to communicate with people that are not currently in the game (e.g., non-players or inactive players) via various messaging platforms (e.g., short message service (SMS) platforms, multimedia messaging service (MMS) platforms, Facebook Messenger®, instant messaging (IM) platforms such as AIM®, Rich Communication Services (RCS) platforms, Voice Over Internet Protocol (VOIP) platforms such as Skype®, email platforms such as Gmail®, etc.). In some embodiments, the messaging service may expose an application programming interface (API) to game systems so that game developers can interface their in-game communications modules to one or more messaging platforms, and may interface with the messaging platform APIs to provide one-way or two-way out-of-band communications between active players using in-game communications channels and persons outside of the game systems (including but not limited to inactive players) using messaging platform clients on personal/mobile devices such as smartphones, pad or tablet devices, and notebook computers. Embodiments of the messaging service may act as a bridge between in-game communications modules that implement in-game communications channels and various public (standardized communications protocol) or private (proprietary communications protocol) messaging platforms. Embodiments may also obfuscate the identities of the players so that the players' personal information is not exposed.

Figure 16:
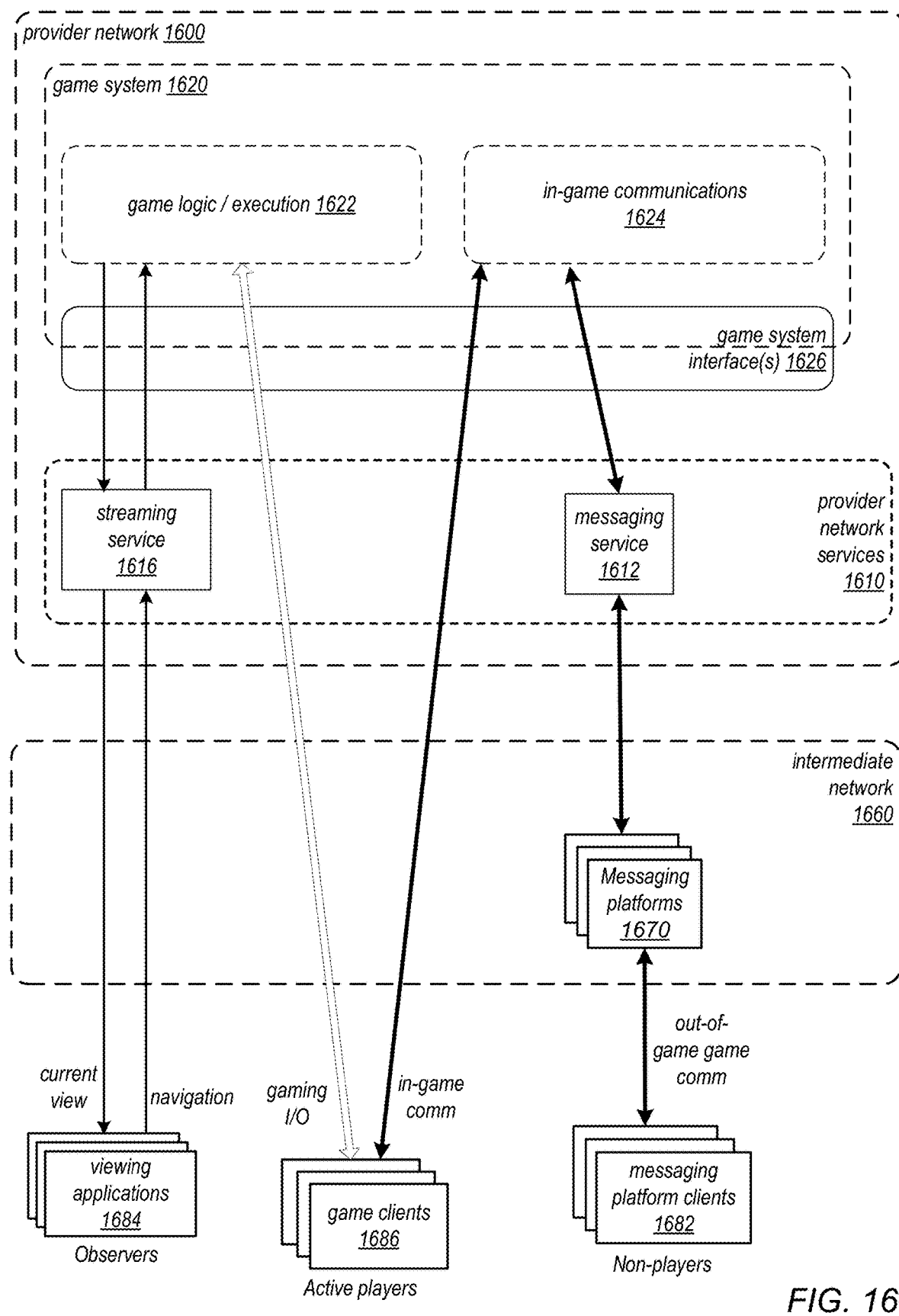
FIG. 16 illustrates an example network-based multiplayer gaming environment that supports in-game to out-of-game messaging and observer mode, according to some embodiments.

In some embodiments, the messaging service may be implemented as a service that is separate from the game systems, for example as a provider network service as illustrated in FIG. 16, and thus may be accessed by multiple game systems to provide out-of-band communications to active players in games executing in the respective game systems. Alternatively, the messaging service may be implemented as a component of a game system to provide out-of-band communications to active players in games executing within that game system.

Figure 9:
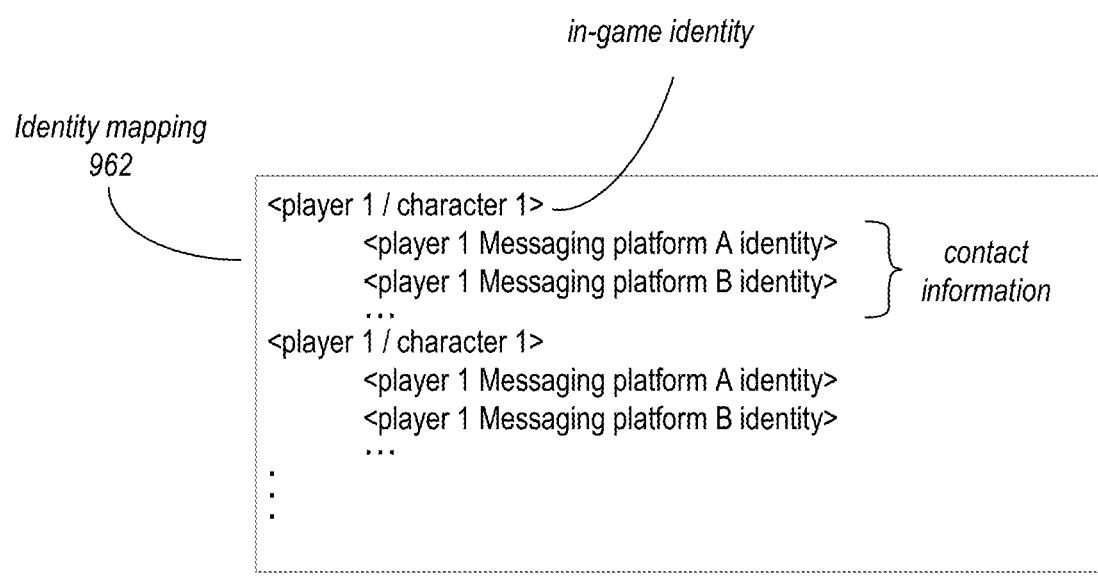
FIG. 9 illustrates identity mapping for players in a multiplayer game system, according to some embodiments.

In some embodiments, players may provide their contact information (e.g., cell phone number, email address, messaging platform identities, etc.) and their in-game identities to the game system or to the messaging service, for example during a registration process for the game or for a registration process for the messaging service. The in-game identities and contact information for the players may be stored in an identity mapping store. If the contact information was provided via the game system, the game system may forward the information to the messaging service. FIG. 9 illustrates identity mapping for players in a multiplayer game system, according to some embodiments.

In some embodiments, during game play, a player may send a message to another player's in-game identity via an in-game communications channel. Upon detecting that the target player is not currently in the game, the messaging service may map the inactive player's in-game identity to one or more messaging platform identities, tag the source of the message with the sending player's in-game identity, and forward the message to the out-of-game player at their messaging platform identity(s) via one or more messaging platforms. The out-of-game player may respond to the message via the messaging platform(s), and/or may act based on the message (e.g., by joining the game via a game client). If the out-of-game player responds to the message via the messaging platform, the response is routed to the messaging service by the messaging platform. The messaging service maps the messaging platform identity of the player to the player's in-game identity, and passes the response to the game system. The response indicates the non-player's in-game identity as the source of the response. The game system then sends the response to the active player via an in-game communications channel. The real identities of the players may thus be obfuscated so that a player's real identity and personal contact information are not exposed to other players.

In some embodiments, a message sent to an out-of-game player may include additional information, which in some cases may be automatically added or attached to the outbound message by the game system or the messaging service. Examples of additional information that may be added or attached to a message may include one or more of, but is not limited to, a location of the active player within the game, a link to join the game, a virtual object to be given to the inactive player's game character, and one or more attributes or conditions to be applied to the inactive player's character upon joining the game.

In some embodiments, the game system may provide an in-game interface via which an active player can select or enter the in-game identity of another player not currently active in the game, select or enter a message, optionally specify additions or attachments to the message, and then send the message to the inactive player. The messaging service may then map the in-game identity of the inactive player to one or more messaging platform identities of the player, and forward the message (with obfuscated identities) to the inactive player via one or more messaging platforms.

Figure 11A:
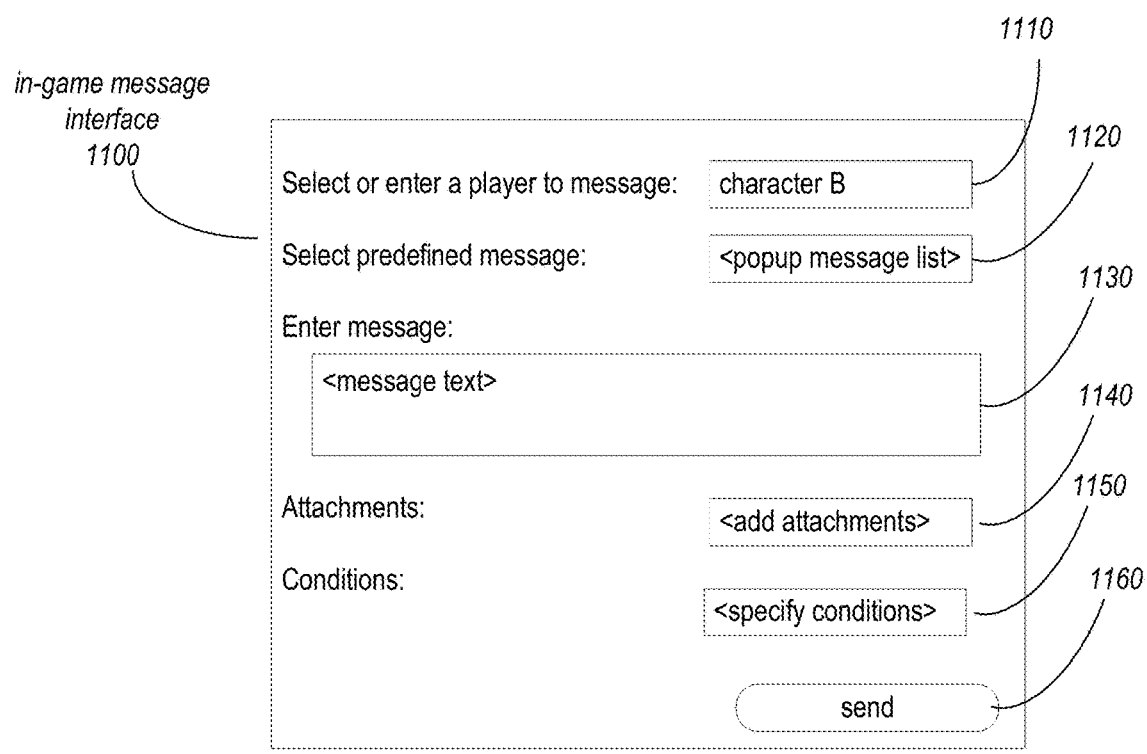
FIGS. 11A and 11B illustrate game system interfaces for messaging inactive players or other persons outside the game, according to some embodiments.
Figure 11B:
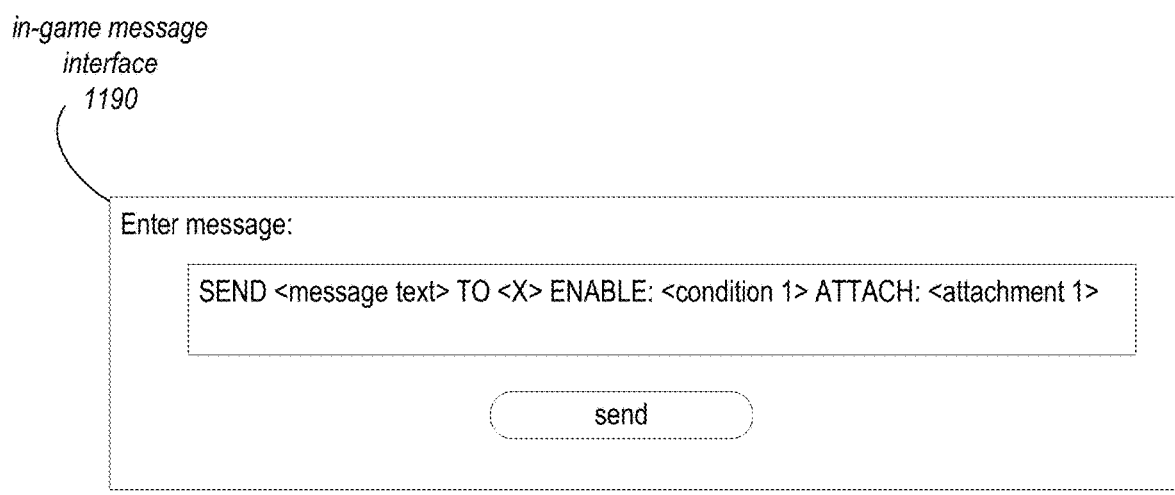

FIGS. 11A and 11B illustrate example game system interfaces for messaging inactive players or other persons who are not participating in the game.

In some embodiments, in addition to messages to inactive players generated by active players, messages to inactive players may be generated by in-game events. An in-game event may trigger a message to one or more players, for example members of a team or game group. Upon detecting that a player is inactive (not currently logged on to the game system), the game system passes the message to the messaging service. The messaging service maps the player's in-game identity to the player's messaging platform identity(s), and then sends the message to the inactive player via the messaging platform(s).

Figure 12:
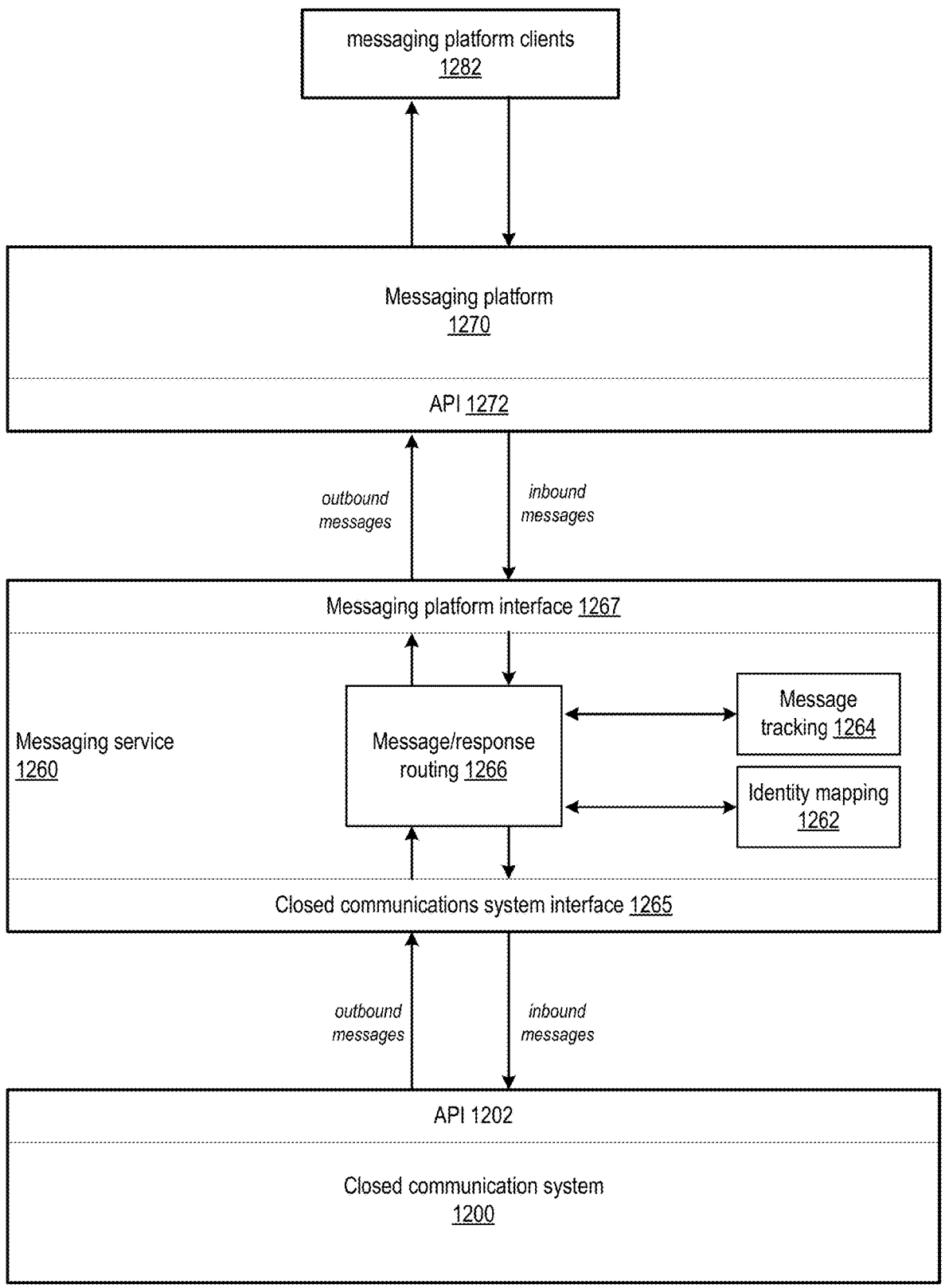
FIG. 12 illustrates a messaging service that serves as an interface between closed communications systems such as multiplayer game systems and messaging platforms, according to some embodiments.

While embodiments are primarily described herein in the context of a messaging system that provides out-of-band communications to active players in a game system so that the active players can message inactive players, embodiments of the messaging service may be applied in any closed communication system to allow active participants within that system to message persons outside that system via messaging platforms while obfuscating the identities and contact information of the persons participating in the communications, for example as illustrated in FIG. 12.

Embodiments of "observer mode" methods and apparatus for game systems are also described that enable a user to access the game world without requiring a game client (e.g., via a web browser or other lightweight viewing application) so that the user (referred to as an observer) can view and navigate within the game world while not actively playing the game. Some game systems such as MMOGs and MMORPGs may provide a virtual game world in which players participate as characters in game clients executing on client devices. In such game systems, there is a desire for persons who are not actively playing in the game world to be able to view what is going on within the game world. In embodiments, when a user that is not a player accesses the game in observer mode, a view of the game world is rendered from a viewpoint of the observer's character; the observer's character is a "virtual" character that does not correspond to an active character in the game and the observer's character may not be visible or otherwise detectable to other players/characters in the game. The rendered view of the game world, from the perspective of the observer's character, is streamed to a viewing application (e.g., a web browser or other application that supports receiving and displaying streamed video) on a personal device (e.g., tablet device, smartphone, notebook, etc.) of the observer. Navigation inputs to the personal device are sent back to the game system, and cause the observer's character to move freely within the game world, for example jumping to different locations, moving (flying, walking, running, etc.) at different speeds, rotating, tilting, etc. In some instances, the movements of a character when operated in an observer mode are not limited to the movements of a player's character (e.g., a player's character may not be able to fly, while an observer's character can fly freely through the game). In some embodiments, an observer may communicate with active players in the game world using the messaging system described above. Embodiments of methods and apparatus for game systems are also described that enable an active player to enter "observer mode" for their character in the game world so that the player can view and navigate within the game world while actively playing the game. In these embodiments, the player's character in observer mode (or observer's character) is an actual character in the game that is made invisible to other players/characters in the game by entering observer mode, as opposed to a "virtual" observer's character of a non-player that enters the game in observer mode.

In some embodiments, a character in observer mode may be subject to the "physics" of the game world; that is, the character in observer mode is invisible, but may only move about in the game world as would a normal character, and the character may be subject to physical interactions (e.g., can be touched, injured, etc.). However, in some embodiments, a character in observer mode may not be subject to at least some of physics of the game world. In these embodiments, for example, a character in observer mode may jump to other locations, move at any speed (not subject to the movement limitations of a normal character), and may not be subject to physical interactions (cannot be touched, injured, etc.). As an example, the ability to go into observer mode may be provided by the game system as an attribute of a particular type of character. As another example, the ability to go into observer mode may be provided by the game system as a special power that can be won, purchased, or otherwise obtained through game play. In some embodiments, players that are participating in a game session may choose to allow or disallow observer mode in the game session. In some embodiments, players in a game world may have or may obtain an attribute that allows the players to see or otherwise detect characters in observer mode. In some embodiments, active players in a game world may have or may obtain an attribute that allows the players to shield or block characters in observer mode from seeing or entering portions of the game world; for example, a "shield camp from players in observer mode" attribute may be obtained by a team of players so that they can block players from other teams from entering and/or viewing their camp when in observer mode.

Embodiments of game systems as described herein may be implemented according to a client-server model in which one or more devices (e.g., server devices) host most or all of the functionality of the game system and one or more client devices hosting game clients (the "clients") access the game system (the "server"), for example via an intermediate network such as the Internet, to play game sessions. However, embodiments of the game system may be implemented according to other models, for example according to a peer-to-peer model.

Figure 17:
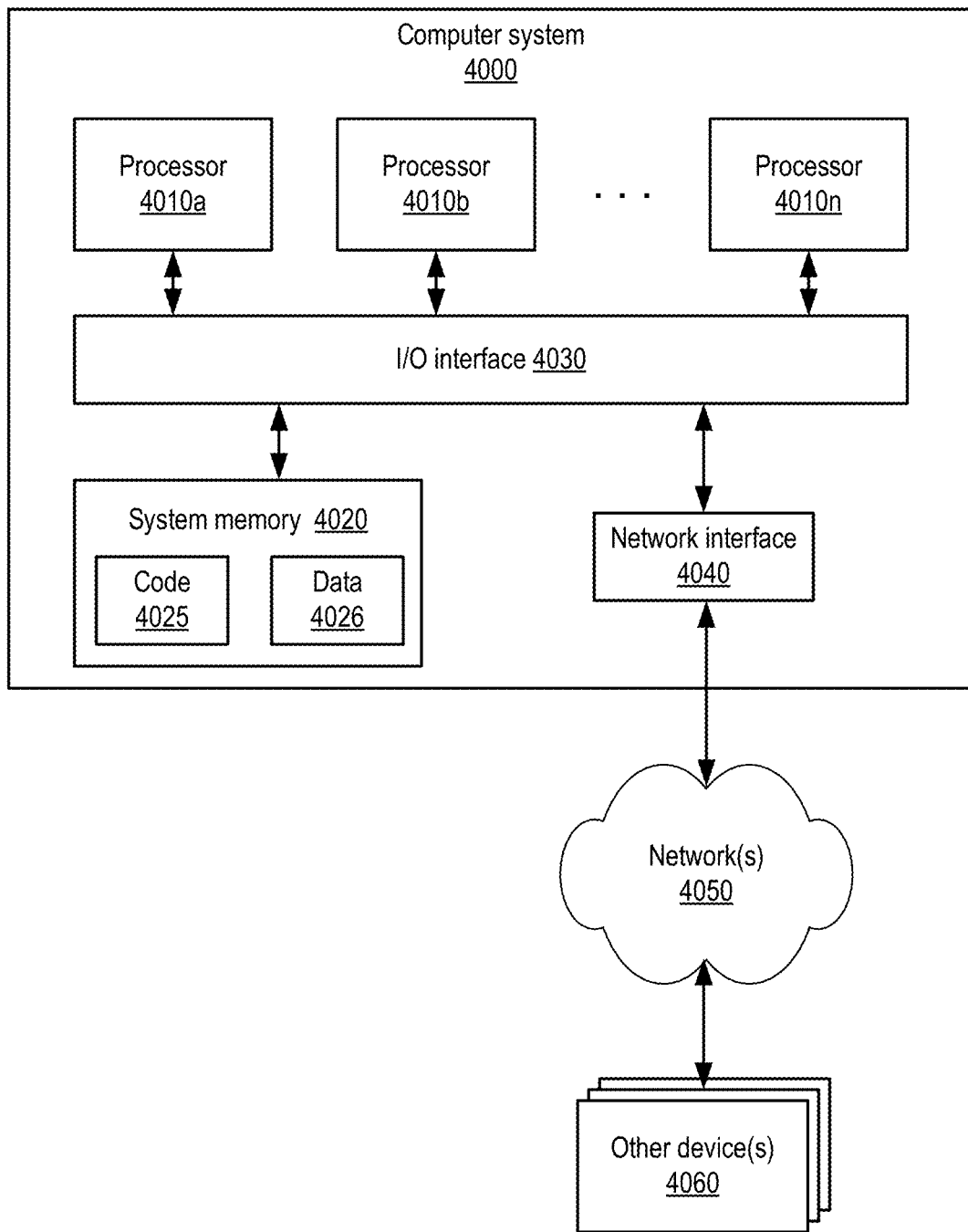
FIG. 17 is a block diagram illustrating an example computer system that may be used in some embodiments.

FIG. 1 is a block diagram that graphically illustrates in-game communications between players in a multiplayer game system, according to some embodiments. In at least some embodiments, a multiplayer game environment may include a multiplayer game system 100 and one or more client devices 120. The multiplayer game system 100 stores game data 108, implements multiplayer game logic, and serves as an execution environment for the multiplayer game. In at least some embodiments, multiplayer game system 100 may include one or more computing devices, for example one or more server devices, that implement the multiplayer game logic, and may also include other devices including but not limited to storage devices that store game data 108. However, in some embodiments, the functionality and components of game system 100 may be implemented at least in part on one or more of the client devices 120. Game data 108 may, for example, store persistent and global data for constructing and rendering the game environment/world, such as graphical objects, patterns, and so on. Game data 108 may also store player information for particular players 150 including but not limited to the player's registration information with the game system 100, game character 152 information, client device 120 information, personal information (e.g., name, account number, contact information, etc.), security information, and preferences. In some embodiments, game data 108 may also store group information for games in which players may form or join game playing groups, which may be referred to as gaming groups. An example computing device that may be used in a multiplayer game system 100 is illustrated in FIG. 17.

A client device 120 may be any of a variety of consumer devices including but not limited to desktop computer systems, laptop/notebook computer systems, pad/tablet devices, smartphone devices, game consoles, handheld client devices, and wearable client devices. Wearable client devices may include, but are not limited to, gaming glasses or goggles and gaming "watches" or the like that are wearable on the wrist, arm, or elsewhere. Thus, client devices 120 may range from powerful desktop computers configured as gaming systems down to "thin" mobile devices such as smartphones, pad/tablet devices, and wearable devices. Each client device 120 may implement an operating system (OS) platform that is compatible with the device 120. A client device 120 may include, but is not limited to, input and output components and software (game clients 122) for the multiplayer game via which respective players 150 can participate in a multiplayer game session currently being executed by the multiplayer game system 100. The game client 122 on a particular client device 120 may be tailored to support the configuration and capabilities of the particular device 120 type and the OS platform of the device 120. An example computing device that may be used as a client device 120 is illustrated in FIG. 17.

In at least some embodiments, the multiplayer game system 100 may implement an online multiplayer game, and the multiplayer game system 100 may be or may include one or more devices on a network of a game provider that implement the online multiplayer game logic and that serve as or provide an execution environment for the online multiplayer game. In these online multiplayer game environments, game clients 120 are typically remotely located from the multiplayer game system 100 and access the game system 100 via wired and/or wireless connections over an intermediate network or networks such as the Internet. Further, client devices 120 may typically each have both input and output capabilities for playing the online multiplayer game. FIG. 16 illustrates an example network-based multiplayer gaming environment that includes a game system hosted on a provider network that may serve as an execution environment for a multiplayer online game.

However, in some embodiments, a multiplayer game system 100 may at least in part be implemented as or on one or more devices that locally implement game logic and that thus locally provide at least some execution of the multiplayer game, for example a gaming console that serves as an execution environment for a console-based multiplayer game installed on the console (or executed from media inserted into the console). In these multiplayer game environments, game clients 120 are typically local to the system 100 and access the system 100 via local wired or wireless connections. Further, in these local multiplayer game environments, the device(s) that hosts the multiplayer game (e.g., a gaming console) may generally include or couple to a display device such as a television or monitor for displaying game graphics, and client devices 120 may typically provide only control/input capabilities for playing the multiplayer game hosted by the device (e.g., the client devices 120 may be "game controllers" coupled to a console).

Note, however, that a multiplayer game system 100 such as a gaming console may connect via wired and/or wireless connections to one or more remote network sites, services, or devices, for example to a network-based storage service for storing and retrieving game data, to a server or servers of the game provider for updates, game downloads, and other information, or to one or more other instances of the multiplayer game system 100 that host the multiplayer game if the multiplayer game environment allows players 150 to participate in a game session from multiple different multiplayer game system 100 instances via a network.

Note that, in FIG. 1 and elsewhere in this document, the term "player" is generally used to refer to an actual human that may participate in a multiplayer game, the term "active player" refers to a player that is actively playing the game, the term "non-player" or "inactive player" refers to a person that is not currently playing the game, the term "client" (as in "client device" and "game client") is generally used to refer to a hardware and/or software interface to a multiplayer game system via which a player interacts with the multiplayer game, and the term "character" or "game character" is generally used to refer to a player's in-game presence or "avatar" that the player may control via a game client on a client device to interact with other game characters, other game entities, and other objects within the game environment during a game session.

Multiplayer games that may be implemented in a multiplayer game environment as described herein may vary from tightly scripted games to games that introduce varying amounts of randomness to the game play. The multiplayer game may, for example, be a game in which the players 150 (via their characters 152) attempt to achieve some goal or overcome some obstacle, and may include multiple levels that the players 150 have to overcome. The multiplayer game may, for example, be a game in which the players 150 cooperate to achieve goals or overcome obstacles, or a game in which one or more of the players 150 compete against one or more other players 150, either as teams or as individuals. Alternatively, a multiplayer game may be a game in which the players 150 may more passively explore and make discoveries within a complex game world 104 without any particular goals in mind, or a "world-building" multiplayer game in which the players 150 may actively modify their environments within the game world 104. The multiplayer games may include everything from relatively simple, two-dimensional (2D) casual games to more complex 2D or three-dimensional (3D) action or strategy games, to complex 3D massively multiplayer online games (MMOGs) such as massively multiplayer online role-playing games (MMORPGs) that may simultaneously support hundreds or thousands of players in a persistent online "world".

One or more players 150 may interact with game system 100 via respective client devices 120 to initiate a game session and to control the players' respective characters 152 in the game as it progresses. FIG. 1 shows, as a non-limiting example, two active players 150A and 150B that control their respective characters 152A and 152B via game clients 122A and 122B on respective client devices 120A and 120B. In at least some embodiments, game system 100 may store in game data 108 player information for each player 150 including but not limited to the player's game character 152 information and security information for the player 150. The security information for a player 150 may include information (as a simple and non-limiting example, a password) that can be used to authenticate a player 150 and to authorize the player's access to the game system and to the player's resources in the game system 100 such as the player's game character(s) 152 and gaming group(s) to which the player 150 may belong. The security information may, for example, be used to prevent one player 150 from controlling a character 152 of another player 150 without the other player's permission.

For a particular game session, game logic/execution 102 of the game system 100 may generate a game world 104 that includes the game session's context, characters, and environment. The players 150 manipulate their characters 152 within this world 104 via the client devices 120. The game system 100 may generate and display a view of the game world 104 from the perspective of each player's character 152 to the player 150 via the game client 122 on the player's respective client device 120, and may receive player input to and interactions with the game world 104 via the player's manipulation of each player's respective character 152 via the game client 122 on the player's respective client device 120.

The following is a broad description of an example method for game execution, and is not intended to be limiting. Typically, game logic/execution 102 of the game system 100 is implemented according to event-driven architecture in which a game event loop monitors for and reacts to players' inputs to and interactions with the game world 104 via their characters 152 as controlled by game clients 122 on client devices 120. Based upon the players' inputs and interactions with the world 104 and on other game factors (e.g., scripted events and/or a randomness component) at iterations of the game event loop, the game session progresses along a game session timeline, with the game world 104 being modified and updated accordingly.

In some embodiments, concurrent with the game event loop execution, game system 100 renders a 2D or 3D representation of the world 104 based on the current state of the world 104, generates video and sound according to a video frame rate based upon the rendering, and sends or streams the video and sound output to the game clients 122 on client devices 120 for display. Note that video and sound may be generated for and sent or streamed to each client device 120 according to a corresponding character 152's current perspective or view of the world 104. These game clients 122 may be referred to as "thin" game clients 122 as the game clients 122 may not implement a 2D or 3D rendering component. However, in some embodiments, at least a portion of the actual rendering may be performed by game clients 122 on the client devices 120 that do implement a 2D or 3D rendering component. In these implementations, instead of the game system 100 performing the full rendering of the game world 104 into video and sound and sending the video and sound to game clients 122 on client devices 120 for display, the game system 100 may instead send world 104 data to the client devices 120 from which thick game clients 122 can render and display video and sound.

In at least some game systems 100, active players 150A and 150B may communicate via in-game communications channels provided by an in-game communication module 160. For example, some multiplayer games involve teams of players 150 that compete against each other, and active players 150 of a team may communicate via voice (e.g., using a headset 154) and/or text using an in-game communications channel dedicated to that team. However, an active player 150A or 150B may want to communicate with an inactive player 150C, for example a member of their team that is not currently logged on to the game via a game client 122 on a client device 120. (Note that an inactive player 150C may be anywhere, and thus may not have access to their client device 120). Currently, this cannot be accomplished from within the game, and an active player 150A or 150B either has to switch to another application on their client device 120 (e.g., an email or text messaging application) or use another device (e.g., a cell phone) to contact the inactive player 150. It is also notable that this requires that an active player 150A or 150B has the contact information for the inactive player 150C. However, teams of players may be formed of strangers from different parts of the world, and people interested in playing a game typically do not wish to expose their personal contact information to strangers.

Figure 2:
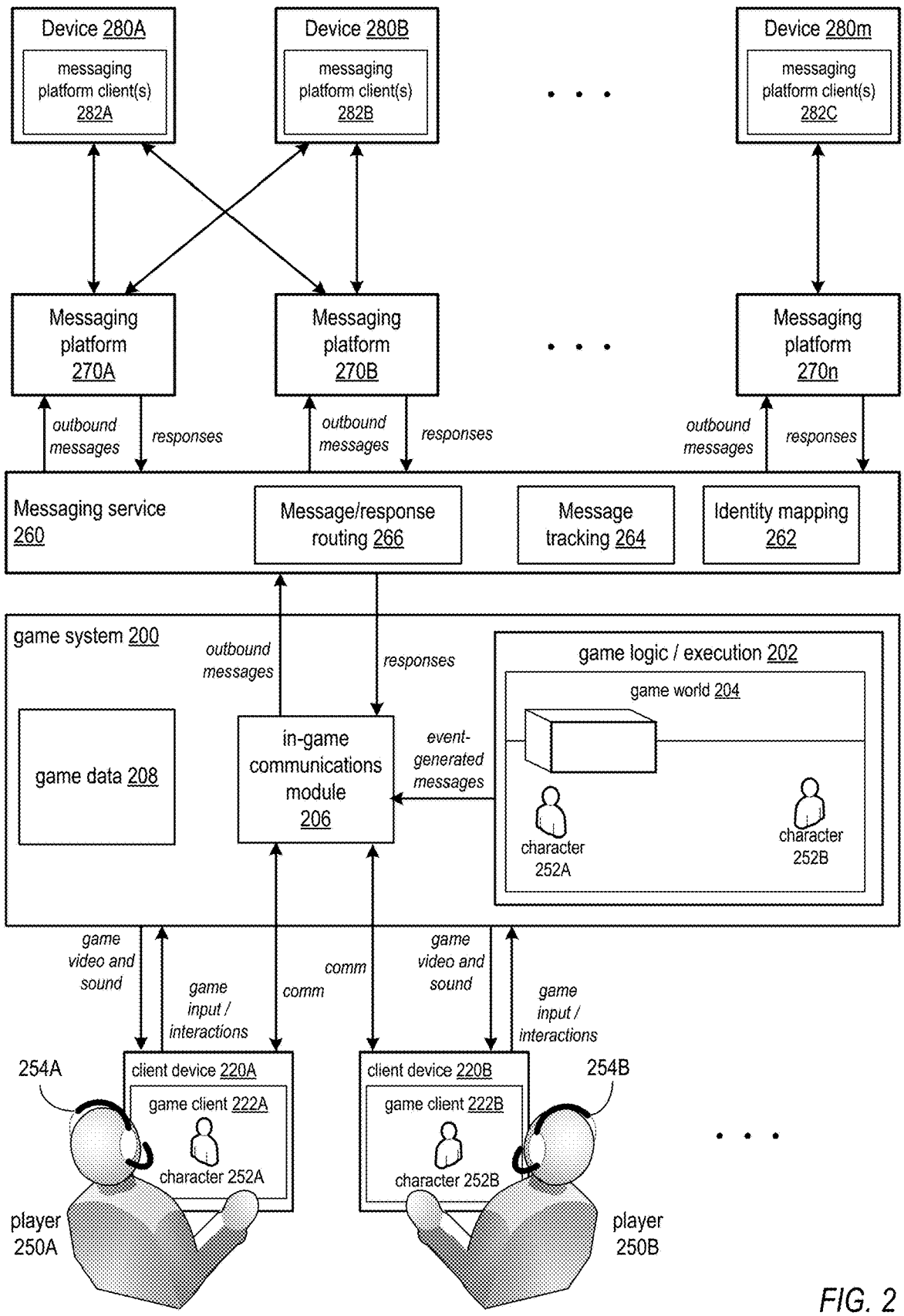
FIG. 2 illustrates a messaging service that enables active players in a multiplayer game system to communicate with people outside the game including inactive players via various messaging platforms, according to some embodiments.

FIG. 2 illustrates a messaging service that enables active players in a multiplayer game system to communicate with people outside the game including inactive players via various messaging platforms, according to some embodiments. Messaging service 260 may enable active players (e.g., players 250A and 250B) to communicate with people that are not currently in the game (non-player(s) 250C) via various messaging platforms 270A-270n (e.g., short message service (SMS) platforms, multimedia messaging service (MMS) platforms, Rich Communication Services (RCS) platforms, Facebook Messenger®, instant messaging (IM) platforms such as AIM®, Voice Over Internet Protocol (VOIP) platforms such as Skype®, email platforms such as Gmail®, etc.). In some embodiments, the messaging service 260 may expose an application programming interface (API) to game system(s) 200 so that game developers can interface their in-game communications modules 206 to one or more messaging platforms 270, and may interface with the messaging platform 270 APIs to provide one-way or two-way out-of-band communications between active players 250 using in-game communications channels and non-players 250 using messaging platform clients 282 on personal/mobile devices 280 such as smartphones, pad or tablet devices, and notebook computers. Embodiments of the messaging service 260 may act as a bridge between in-game communications modules 206 that implement in-game communications channels and various public (standardized communications protocol) or private (proprietary communications protocol) messaging platforms 270. Embodiments may also obfuscate the identities of the players 250 so that the players' personal information is not exposed.

In some embodiments, the messaging service 260 may be implemented as a service that is separate from the game systems 200, for example as a provider network service as illustrated in FIG. 16, and thus may be accessed by multiple game systems 200 to provide out-of-band communications to active players 250 in games executing in the respective game systems 200. Alternatively, the messaging service 260 may be implemented as a component of a game system 200 to provide out-of-band communications to active players 250 in games executing within that game system 200.

In some embodiments, players 250 may provide their contact information (e.g., cell phone number, email address, messaging platform identities, etc.) and their in-game identities to the game system 200 or to the messaging service 260, for example during a registration process with the game system 200 or during a registration process with the messaging service 260. The in-game identities and contact information for the players may be stored in an identity mapping 262 store. If the contact information was provided via the game system 200, the game system 200 may forward the information to the messaging service 260. FIG. 9 illustrates identity mapping for players in a multiplayer game system, according to some embodiments.

In some embodiments, during game play, an active player 250 may send a message to another player 250's in-game identity via an in-game communications channel. For example, some multiplayer games involve teams of players 250 that compete against each other, and active players 250 of a team may communicate via voice (e.g., using a headset 254) and/or text using an in-game communications channel dedicated to that team. Upon detecting that a player 250 to which a message is sent is not currently active (i.e., is a non-player 250), the message may be forwarded to the messaging service 260. A message/response routing 266 component of the messaging service 260 may map the non-player 250's in-game identity to one or more messaging platform 270 identities using the identity mapping 262 data, tag the source of the message with the active player 250's in-game identity, and forward the message to the non-player 250 at their messaging platform identity(s) via one or more messaging platforms 270. The message may be received by non-player 250 on a messaging platform client 282 executing on a personal/mobile device 280, for example a smartphone, tablet or pad device, or notebook computer. The non-player 250 may respond to the message via the messaging platform(s) 270, and/or may act based on the message (e.g., by joining the game via a game client 222).

If the non-player 250 responds to the message via the messaging platform 270, the response is routed to the messaging service 260 by the messaging platform 270. The message/response routing 266 component of the messaging service 260 maps the messaging platform identity of the non-player 250 to the player's in-game identity using the identity mapping 262 data, and passes the response to the in-game communications module 206 of the game system 200. The response indicates the non-player 250's in-game identity as the source of the response. The in-game communications module 206 then sends the response to the active player(s) 250 via an in-game communications channel. The real identities of the players 250 may thus be obfuscated so that a player 250's real identity and personal contact information are not exposed to other players 250.

In some embodiments, a message sent to a non-player 250 may include additional information, which in some cases may be automatically added or attached to the outbound message by the game system 200 or the messaging service 260. Examples of additional information that may be added or attached to a message may include one or more of, but is not limited to, a location of an active player 250 within the game world 204, a link to join the game, a virtual object (e.g., a weapon or tool) to be given to the non-player 250's game character, and one or more attributes or conditions to be applied to the non-player 250's character upon joining the game.

In some embodiments, game system 200 and/or messaging service 260 may store message tracking 264 information. Message tracking 264 information may, for example, include information tracking the state of messages sent to non-players 250 via messaging platform(s) 270. Message tracking 264 information may also include information indicating attributes or conditions that were attached to the messages and that are to be applied to a non-player's 250 character when next entering the game, or that are to be applied to the non-player's 250 character when next entering the game. When the player 250 joins the game, the message tracking 264 information may be accessed to obtain the attributes or conditions that are to be applied to the player's 250 character.

In some embodiments, the game system 200 may provide an interface via game clients 222 via which an active player 250 can select or enter the in-game identity of a non-player 250, select (e.g., from a list of predefined messages) or enter a message, optionally specify additions or attachments to the message, and then send the message to the non-player 250. The message may be sent to the messaging service 260, which may then map the in-game identity of the non-player 250 to one or more messaging platform identities of the non-player 250, and forward the message (with obfuscated identities) to the non-player 250 via one or more messaging platforms 270. The non-player 250 may, but does not necessarily, respond to the message via a messaging platform 270.

In some embodiments, the game system 200 may provide an interface via game clients 222 via which an active player 250 can send a message to a group of players. If one or more of the players in the group are not currently participating in the game, the message may be sent to the messaging service 260, which may then map the in-game identity of the non-player(s) 250 to one or more messaging platform identities of the non-player(s) 250, and forward the message (with obfuscated identities) to the non-player(s) 250 via one or more messaging platforms 270. A non-player 250 may, but does not necessarily, respond to the message via a messaging platform 270. If the non-player 250 does respond to the message, the response may be forwarded to one or more, or all, of the other players in the group to which the original message was sent.

In some embodiments, an in-game event may trigger a message to one or more players 250, for example members of a team or game group. Upon detecting that a player 250 is inactive (not currently logged on to the game system), the in-game communications module 206 passes the message to the messaging service 260. The messaging service 260 maps the non-player 250's in-game identity to the non-player 250's messaging platform identity(s), and then sends the message to the non-player 250 via the messaging platform(s) 270.

Figure 3A:
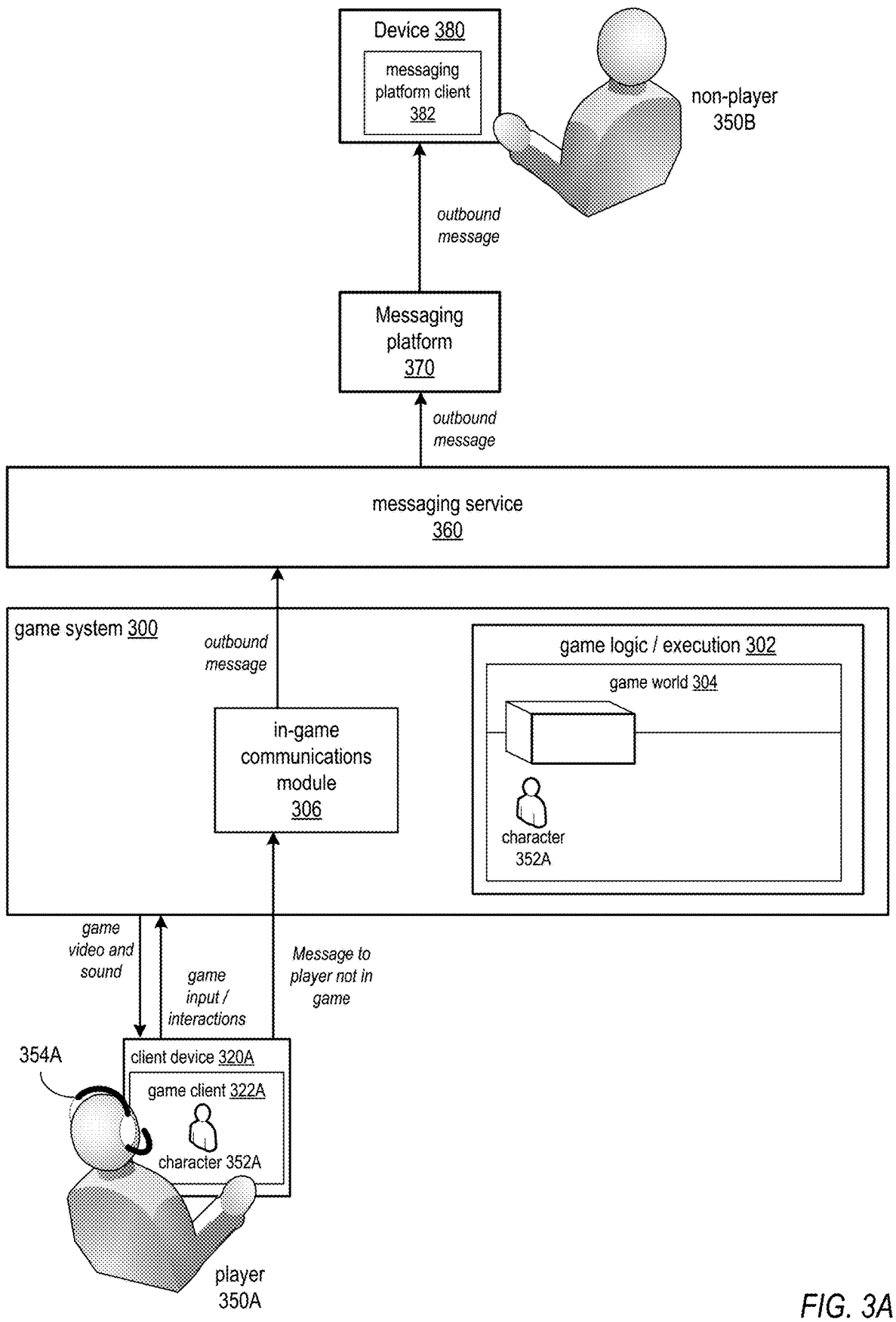
FIG. 3A illustrates an active player messaging a non-player via an in-game communications channel, according to some embodiments.

FIG. 3A illustrates an active player messaging a non-player via an in-game communications channel, according to some embodiments. An active player 350A using a game client 322A on a client device 320A to participate as a character 352A in a game world 304 being executed in a game/logic execution 302 environment of a game system 300 may send a message to a non-player 350B via voice (e.g., using a headset 354) or via text using an in-game communications channel provided by in-game communications module 306. Module 306 may send the message to messaging service 360. Messaging service 360 may be implemented as a service that is separate from the game system 300, for example as a provider network service as illustrated in FIG. 16. Alternatively, messaging service 360 may be implemented as a component of game system 300. Messaging service 360 may map the non-player 350B's in-game identity to the non-player 350B's messaging platform 370 identity, tag the source of the message with the active player 350A's in-game identity, and forward the message to the non-player 350B at their messaging platform identity via messaging platform 270. The message may be received by non-player 350B on a messaging platform client 382 executing on a personal/mobile device 380, for example a smartphone, tablet or pad device, or notebook computer. The non-player 350B may respond to the message via the messaging platform 370, and/or may act based on the message (e.g., by joining the game via a game client on a client device).

In some embodiments, the message sent to non-player 350B may include additional information, which in some cases may be automatically added or attached to the outbound message by the game system 300 or the messaging service 360. Examples of additional information that may be added or attached to a message may include one or more of, but is not limited to, a location of active player 350A within the game world 304, a link to join the game, a virtual object (e.g., a weapon or tool) to be given to the non-player 350B's game character, and one or more attributes or conditions to be applied to the non-player 350B's character upon joining the game.

Figure 3B:
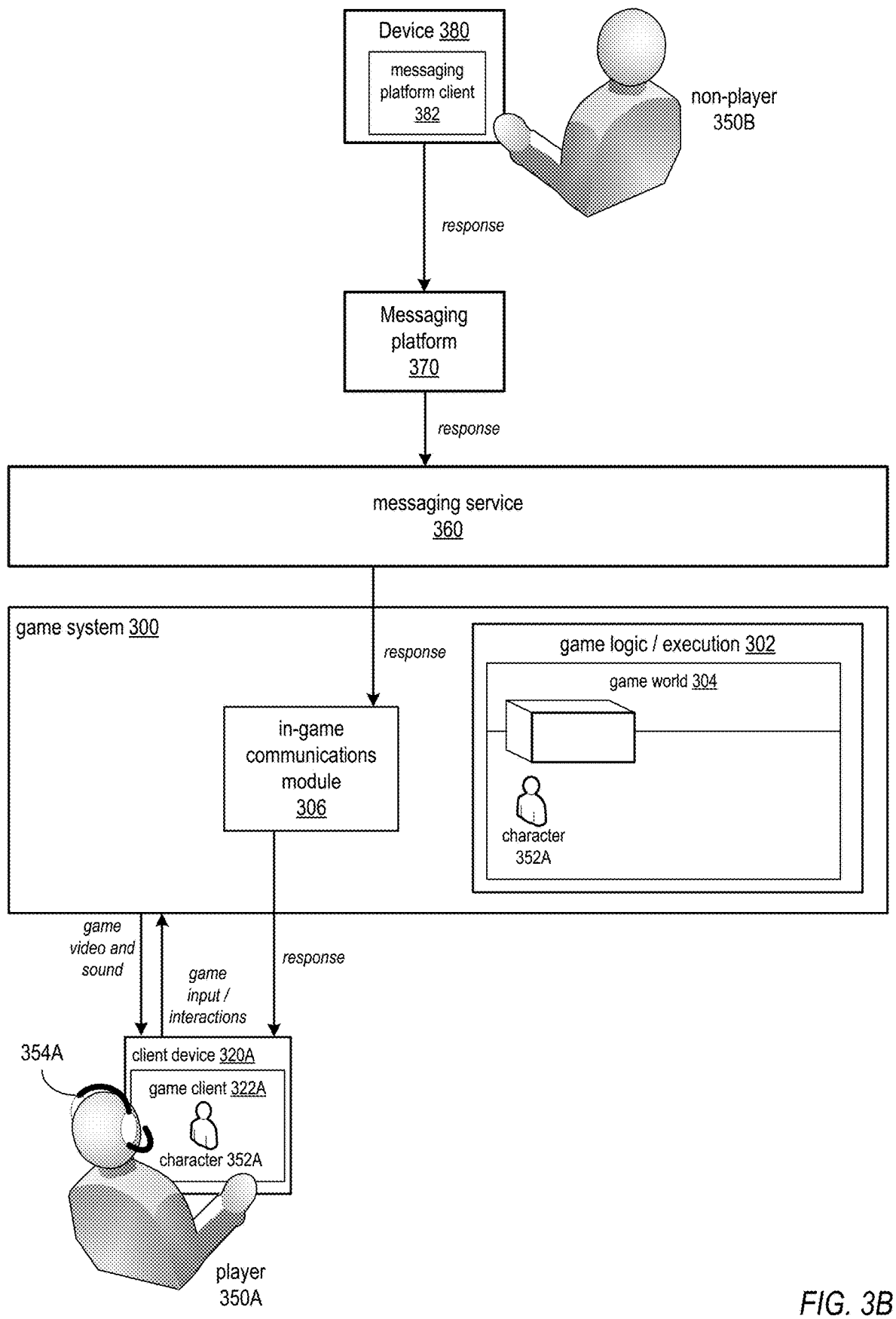
FIG. 3B illustrates a non-player responding to the active player via a messaging platform, according to some embodiments.

FIG. 3B illustrates a non-player responding to the active player via a messaging platform, according to some embodiments. The non-player 350B may respond to the message from active player 350A using the messaging platform client 382 executing on personal/mobile device 380, for example a smartphone, tablet or pad device, or notebook computer. The response is routed to the messaging service 360 by the messaging platform 370. The messaging service 360 maps the messaging platform identity of the non-player 350B to the player's in-game identity and passes the response to the in-game communications module 306 of the game system 300. The response indicates non-player 350B's in-game identity as the source of the response. The in-game communications module 306 then sends the response to the active player 350A via an in-game communications channel.

Figure 3C:
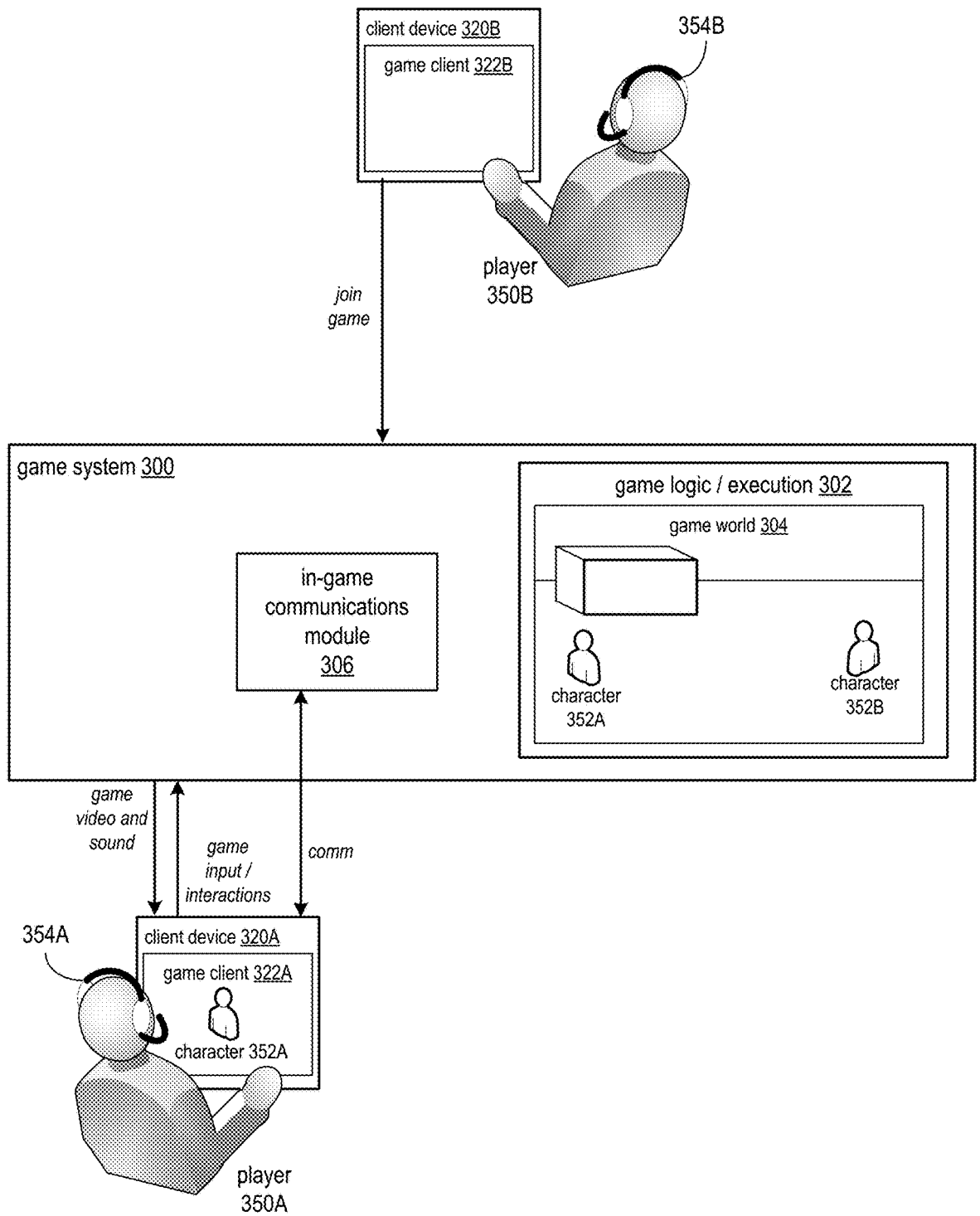
FIGS. 3C and 3D illustrate a non-player joining the game in response to the message from the active player, according to some embodiments.
Figure 3D:
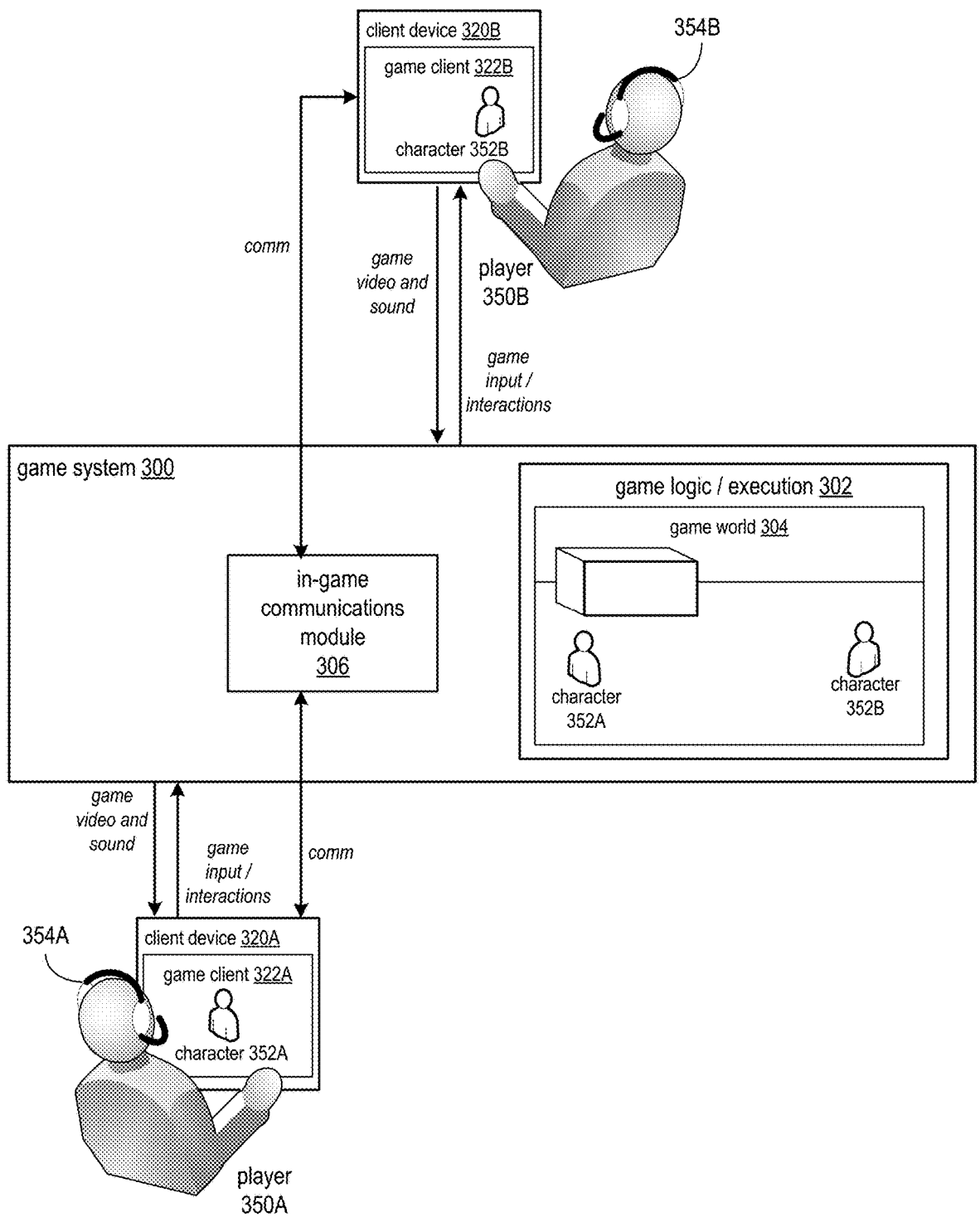

FIGS. 3C and 3D illustrate a non-player joining the game in response to the message from the active player, according to some embodiments. A message from an active player 350A to a non-player 350B may request that the non-player 350B join the game. The non-player 350B may then join the game as character 352B via a game client 322B on a client device 320B as shown in FIG. 3C to become active player 350B as shown in FIG. 3D.

As noted above, in some embodiments, the message sent to non-player 350B may include additional information including one or more of a location of active player 350A within the game world 304, a link to join the game, a virtual object (e.g., a weapon or tool) to be given to the non-player 350B's game character, and one or more attributes or conditions to be applied to the non-player 350B's character upon joining the game. In some embodiments, game system 300 and/or messaging service 360 may store information indicating attributes or conditions that were attached to the message and that are to be applied to non-player 350B's character 352B when next entering the game. When the player 350B joins the game, the stored information may be accessed to obtain the attributes or conditions that are to be applied to character 352B.

Figure 3E:
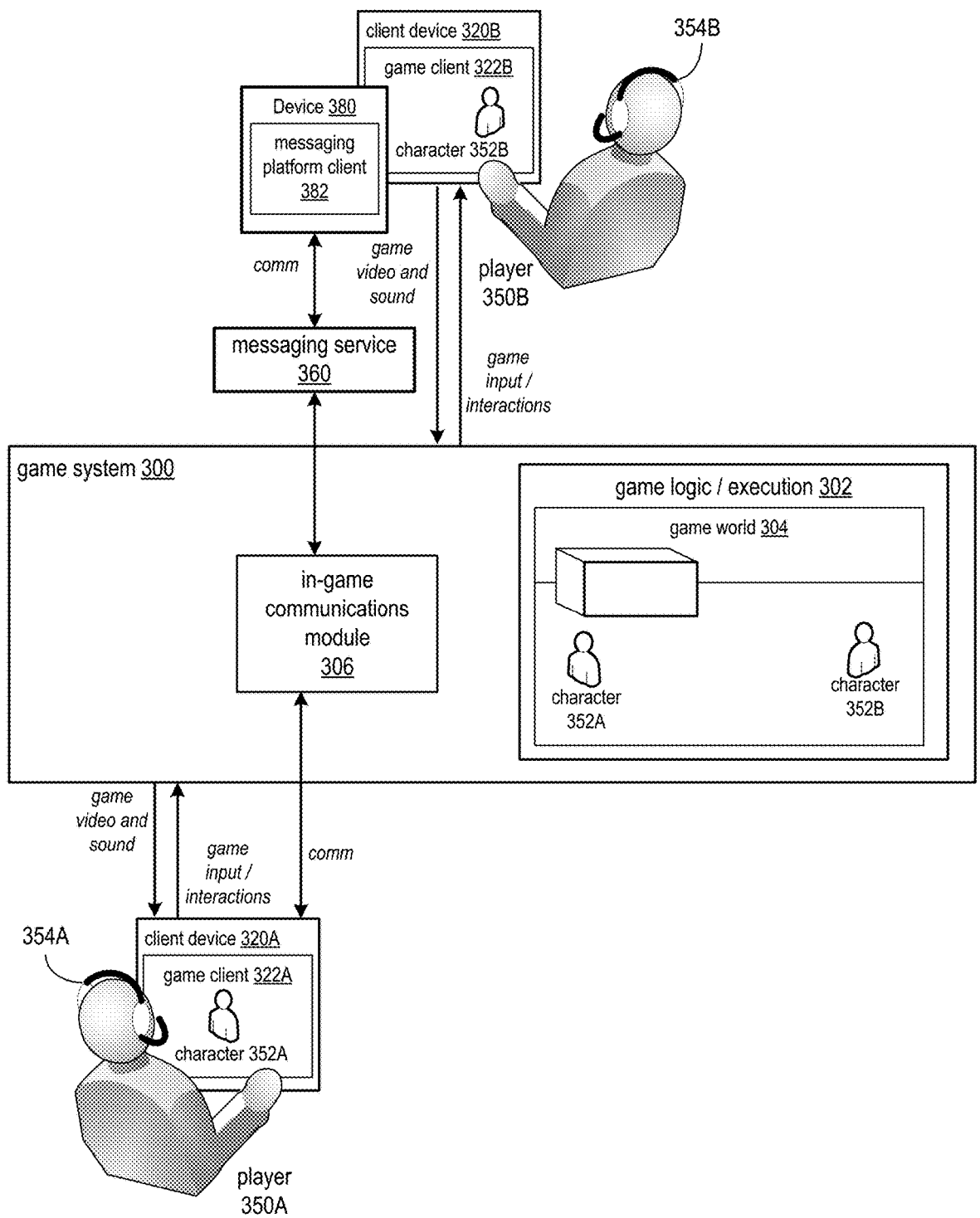
FIG. 3E illustrates an active player using a messaging platform client to interface with in-game communications, according to some embodiments.

FIG. 3E illustrates an active player using a messaging platform client to interface with in-game communications, according to some embodiments. In some embodiments, the messaging service 360 may be leveraged to provide active players 350 in a game an alternative communications channel to other active players 350. An active player 350A using a game client 322A on a client device 320A to participate as a character 352A in a game world 304 being executed in a game/logic execution 302 environment of a game system 300 may communicate with other players (e.g., player 350B) via voice (e.g., using a headset 354) or via text using an in-game communications channel provided by in-game communications module 306. An active player 350B using a game client 322B on a client device 320B to participate as a character 352B in game world 304 may communicate with other players (e.g., player 350A) via voice or via text using a messaging platform client on a device 380 (e.g., a smartphone, tablet or pad device, etc.).

Module 306 may send a message sent from player 354A to player 354B to messaging service 360. Messaging service 360 may map player 350B's in-game identity to the player 350B's messaging platform identity, tag the source of the message with the active player 350A's in-game identity, and forward the message to the player 350B at their messaging platform identity. The message may be received by player 350B on a messaging platform client 382 executing on a personal/mobile device 380, for example a smartphone, tablet or pad device, or notebook computer. The player 350B may respond to the message via the messaging platform client 382, and/or may act based on the message.

In some embodiments, the message sent to player 350B may include additional information, which in some cases may be automatically added or attached to the message by the game system 300 or the messaging service 360. Examples of additional information that may be added or attached to a message may include one or more of, but is not limited to, a location of active player 350A within the game world 304, or a virtual object (e.g., a weapon or tool) to be given to the player 350B's game character 352B.

Player 350B may respond to the message from player 350A using the messaging platform client 382. The response is routed to the messaging service 360 by the messaging platform. The messaging service 360 maps the messaging platform identity of the player 350B to the player's in-game identity and passes the response to the in-game communications module 306 of the game system 300. The response indicates player 350B's in-game identity as the source of the response and player 350A's in-game identity as the destination of the response. The in-game communications module 306 then sends the response to the active player 350A via an in-game communications channel.

A player 350B may choose to use the messaging service 360 to communicate with other players 350 rather than an in-game communications channel for various reasons. For example, player 350B may not have a headset 354, and/or player 350B's client device may not sufficiently support the in-game communications channel. Also note that while FIG. 3E shows one player 350 using an in-game communications channel to communicate, and another player 350 using a messaging platform client 382 to communicate, in some embodiments a team or group of players may all decide to use a messaging platform client 382 to communicate. Also note that while FIG. 3E shows the messaging platform client 382 on a separate device 380 from the client device 320 that includes the game client 322, the messaging platform client 382 may instead be on client device 320 along with the game client 322.

Figure 3F:
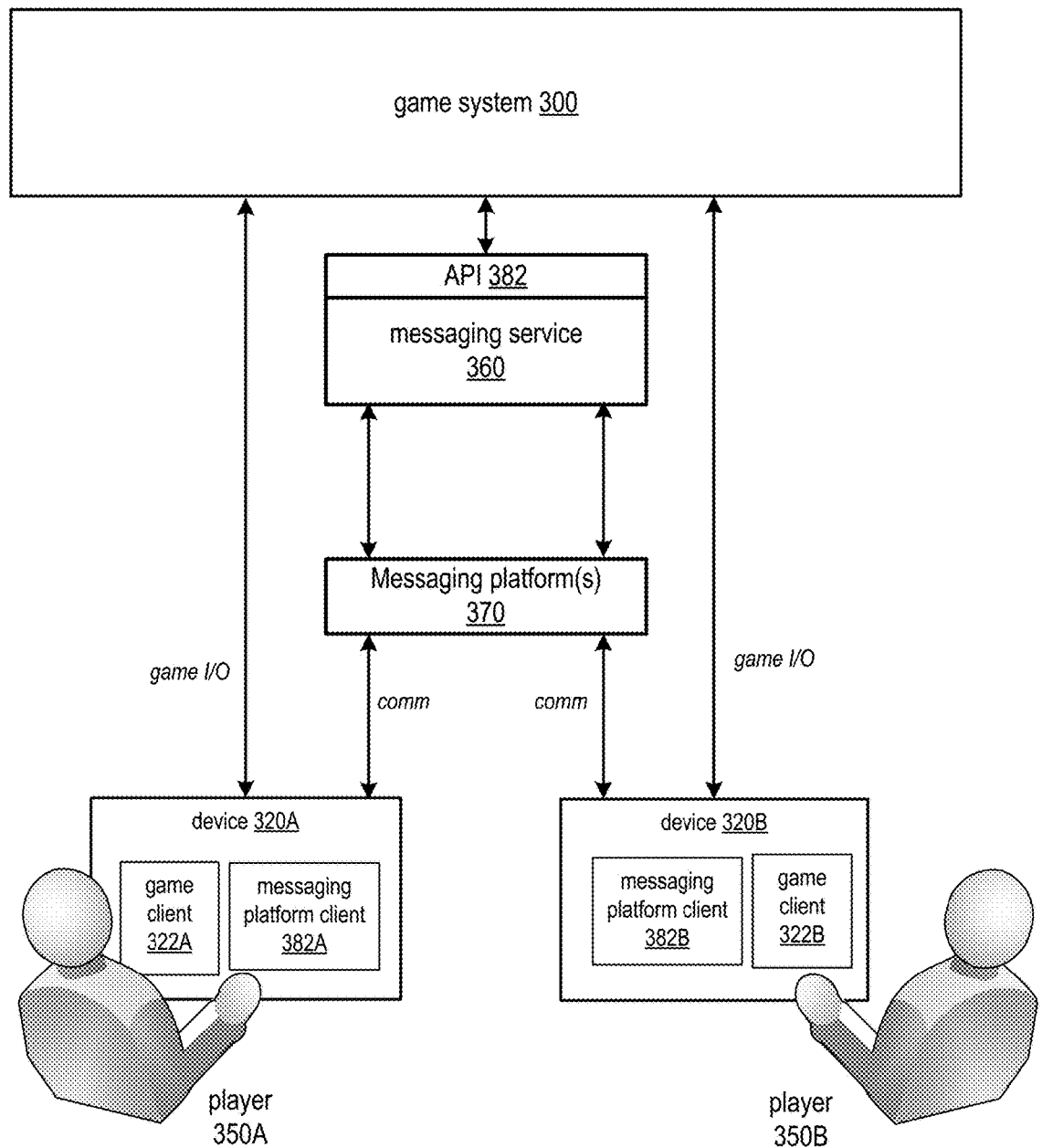
FIG. 3F illustrates a messaging service used as an in-game communications channel, according to some embodiments.

FIG. 3F illustrates a messaging service used as the in-game communications channel of a game system, according to some embodiments. In some embodiments, instead of interfacing with an in-game communications module, a messaging service 360 may provide an API 382 that allows game developers to interface with the messaging service 360 to leverage the messaging service 360 as the in-game communication channel for players 350. An active player 350A using a game client 322A on a device 320A to participate in a game being executed in a game system 300 may communicate with other players (e.g., player 350B) via voice or via text using a messaging platform client 382A on device 320A (e.g., a smartphone, tablet or pad device, laptop, desktop computer, gaming system, etc.). An active player 350B using a game client 322B on a client device 320B to participate the game may communicate with other players (e.g., player 350A) via voice or via text using a messaging platform client 382B on a device 320B (e.g., a smartphone, tablet or pad device, laptop, desktop computer, gaming system, etc.). Rather than routing the messages between the players through an in-game communications channel, the messages are routed through the messaging service 360. Note that players 350A and 350B may also communicate with non-players (e.g., inactive players or persons not registered with the game system 300) via the messaging service 360.

Player 354A may send a message to player 354B via messaging platform client 382A. The message is routed to the messaging service 360 by the messaging platform 370. Messaging service 360 may map player 350B's in-game identity to the player 350B's messaging platform identity, tag the source of the message with the active player 350A's in-game identity, and forward the message to the player 350B at their messaging platform identity. The message may be received by player 350B via messaging platform client 382B. The player 350B may respond to the message via the messaging platform client 382B, and/or may act based on the message.

In some embodiments, the message sent to player 350B may include additional information, which in some cases may be automatically added or attached to the message by the messaging service 360. Examples of additional information that may be added or attached to a message may include one or more of, but is not limited to, a location of active player 350A within the game world, or a virtual object (e.g., a weapon or tool) to be given to player 350B.

Player 350B may respond to the message from player 350A using the messaging platform client 382B. The response is routed to the messaging service 360 by the messaging platform 370. The messaging service 360 maps the messaging platform identity of the player 350B to the player's in-game identity and forwards the message to the player 350A at their messaging platform identity. The response indicates player 350B's in-game identity as the source of the response. The message may be received by player 350A via messaging platform client 382A.

While FIG. 3F shows the messaging platform clients 382 on the same devices 320 that include the game clients 322, a messaging platform client 382 may instead be on a separate device. Also note that active players 350 may send messages to inactive players and/or persons not registered with game system 300 via the messaging platform 360.

Figure 4A:
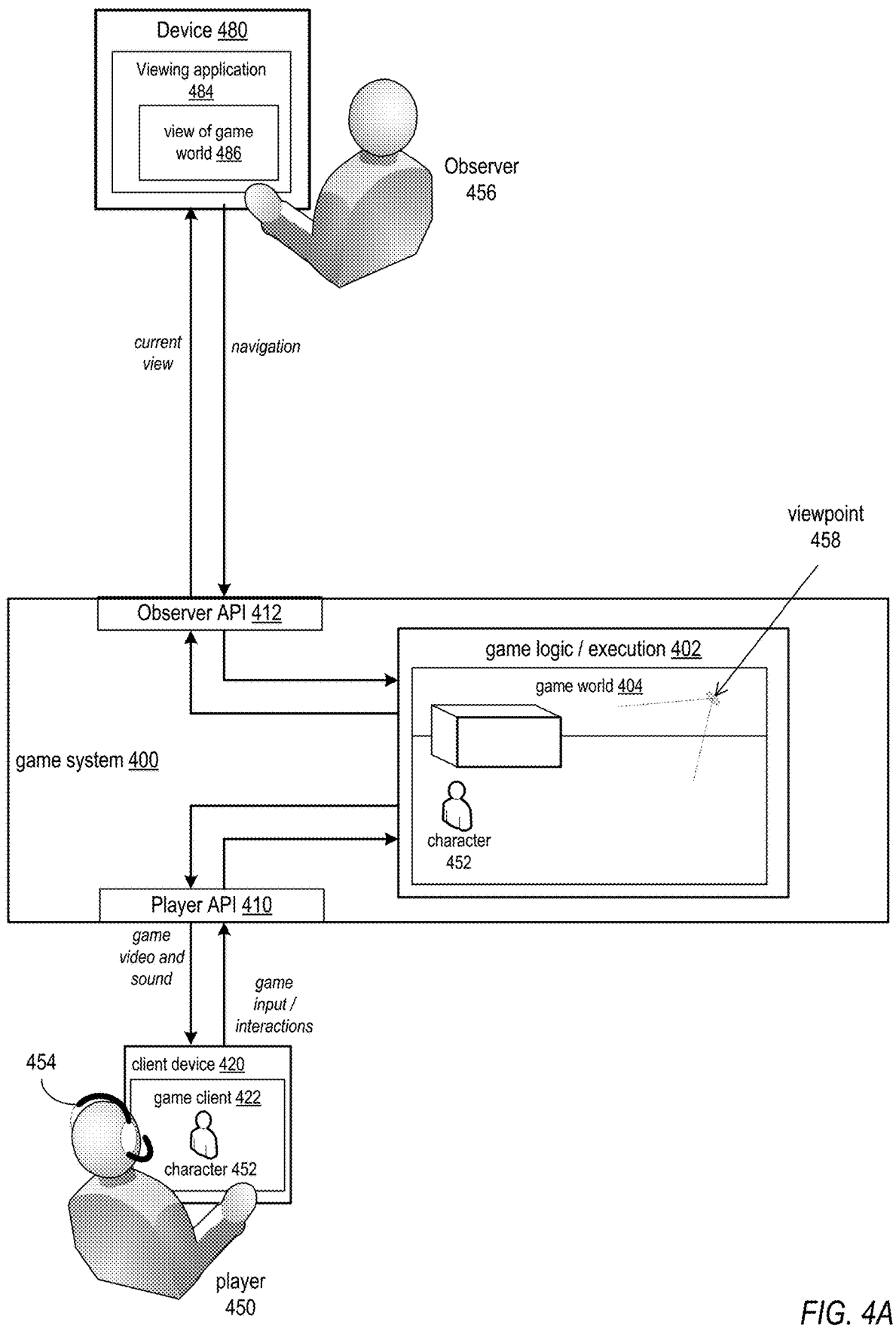
FIG. 4A illustrates a person viewing an active game world in a multiplayer game system as an invisible observer via a viewing application, according to some embodiments.

FIG. 4A illustrates a person viewing an active game world in a multiplayer game system as an invisible observer via a viewing application, according to some embodiments. The game system 400 may provide a player API 410 via which players 450 can access and participate as characters 452 in a game world 404 generated by game logic/execution 402 environment of the game system 400 using game clients 422 on client devices 420. The game system 400 may also provide an "observer mode" and observer mode API 412 that enables a user to access the game world 404 generated by game logic/execution 402 without requiring a game client 422 (e.g., via a web browser or other viewing application 484) so that the user (referred to as an observer 456) can view and navigate within the game world 404 from a mobile/personal device 480 (e.g., a smartphone, tablet/pad device, notebook computer, or cloud-based laptop computer) while not actively participating as a player 450 in the game world 404. An observer 456 may be a player 450 that is not currently playing the game via a game client 422, or may be a person who wants to view and explore the game world 404 but is not a player 450.

In embodiments, a user may access a game world 404 generated by game logic/execution 402 of game system 400 in observer mode from an application 484 on a device 480 through an observer API 412 of the game system 400 to become an observer 456. When the observer 456 accesses the game world 404 in observer mode, a view of the game world 404 is rendered by the game system 400 from a viewpoint 458 of the observer's character; the observer's character does not correspond to any character 452 in the game world 404 and the character of the observer 456 is not visible to the player(s) 450 or character(s) 452 in the game world 404. An initial location of the observer's character in the game world 404 may be specified by the observer 456 (e.g., by selecting the viewpoint 458 on a map of the game world 404), or alternatively the location may default to a predetermined initial location.

The rendered view 486 of the game world 404 from the current viewpoint 458 of the observer's character may be streamed to and displayed by a viewing application 484 (e.g., a web browser or other application that supports receiving and displaying streamed video) on a personal device 480 (e.g., tablet device, smartphone, notebook, etc.) of the observer 456. Navigation inputs to the personal device 480 are sent back to the observer API 412 of the game system 400, and allow the observer's character to be moved freely within the game world 404 under control of the observer 456. For example, the observer 456 may use navigation controls provided on device 480 to jump the observer's character to different locations in the game world 404, to move the observer's character through the game world 404 at different speeds including speeds, or modes of movement, that are not accessible to players 450 via game clients 422. In some embodiments, it can be possible for the observer to rotate, tilt, zoom in, or zoom out the viewpoint 458 of the observer's character independent of movement of the observer's character.

In some embodiments the game system 400 may provide observer mode settings via which players 450 may allow or disallow observer mode in a game world 404 or in portions of the game world 404. In some embodiments, players 450 in a game world 404 may have or may obtain (e.g., via in-game purchase or through accumulation of experience, points, or any other in-game merit system) an attribute that allows the players to see or otherwise detect an observer's character in the game world 404.

In some embodiments, game system 400 may notify the observer 456 via the viewing application 484 of the location of an event, place, or object of interest in the game world 404. The observer 456 may then choose to jump the observer's character to the location of interest within the game world 404. In some embodiments, this could be accomplished by providing a visual indicator of various events or locations on a map of the game world and the user can select an event to jump, or 'teleport,' to that location. Such a map may, at least in some embodiments, only be available to characters operated in observer mode.

Figure 4B:
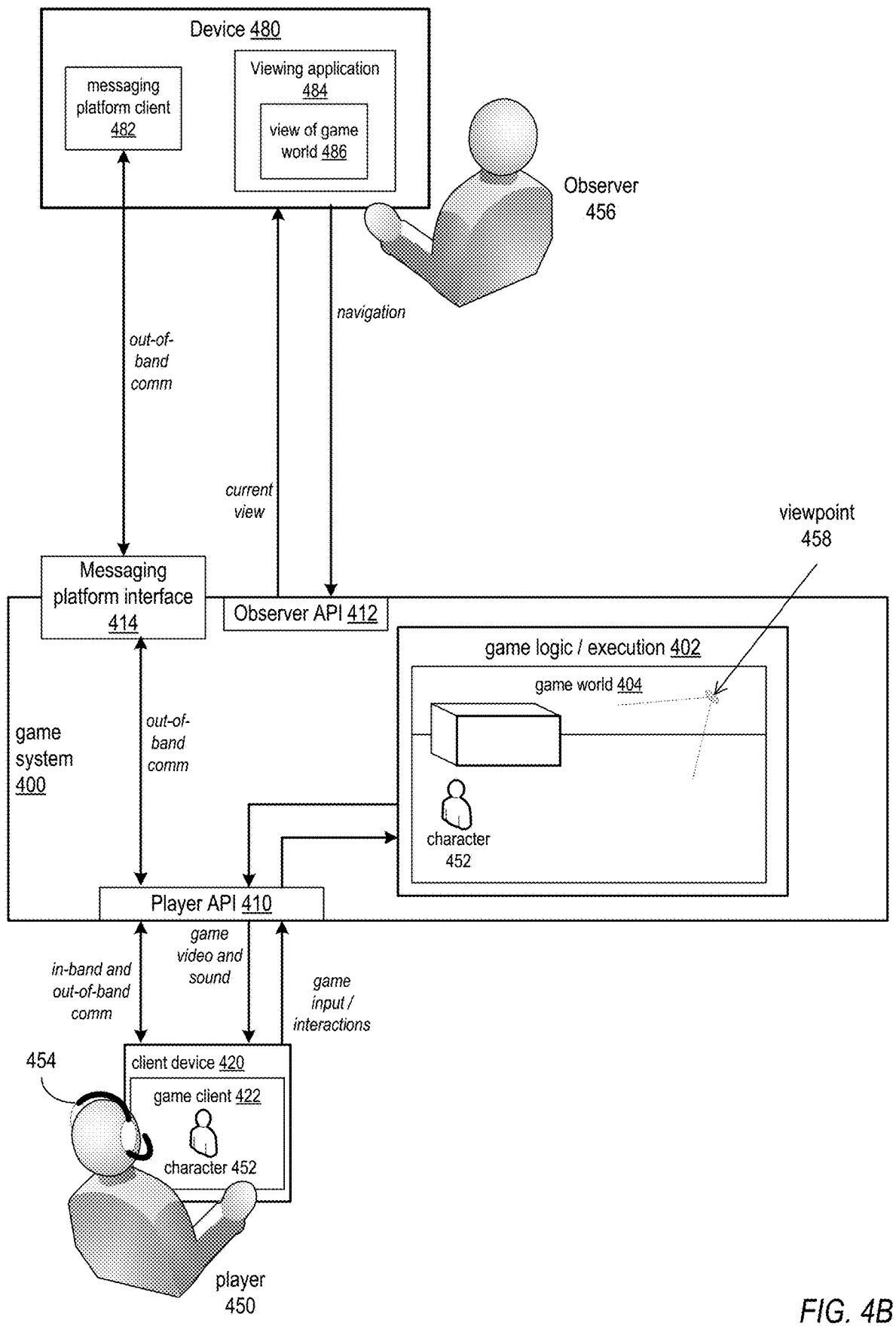
FIG. 4B illustrates a person viewing an active game world as an invisible observer via a viewing application while communicating with an active player via a messaging platform client, according to some embodiments.

In some embodiments, an observer 456 may communicate with active players 450 in the game world via one or more messaging platforms, as illustrated in FIG. 4B. FIG. 4B illustrates a person viewing an active game world 404 as an invisible observer 456 via a viewing application 484 while communicating with an active player 450 via a messaging platform client 482, according to some embodiments.

The game system 400 may provide a player API 410 via which players 450 can access and participate as characters 452 in a game world 404 generated by game logic/execution 402 environment of the game system 400 using game clients 422 on client devices 420. The game system 400 may also provide an "observer mode" and observer mode API 412 that enables a user to access the game world 404 generated by game logic/execution 402 without requiring a game client 422 (e.g., via a web browser or other viewing application 484) so that the user (referred to as an observer 456) can view and navigate within the game world 404 from a mobile/personal device 480 (e.g., a smartphone, tablet/pad device, notebook computer, or cloud-based laptop computer) while not actively participating as a player 450 in the game world 404. An observer 456 may be a player 450 that is not currently playing the game via a game client 422, or may be a person who wants to view and explore the game world 404 but is not a player 450.

The game system 400 may also provide one or more in-game communications channels that allow active players 450 to communicate by text or voice with other active players 450 during game play (referred to as in-band communications). The game system 400 may also provide a messaging platform interface 414 (e.g., a messaging service 360 as illustrated in FIGS. 2 and 3A-3C) that allows observers 456 and active players 450 to communicate through the game system 400's in-game communications channels. An observer 486 may communicate with an active player 450 using a messaging platform client 582 (e.g., an email application, text messaging application, VOIP application, etc.) on device 580. A message sent by observer 580 to an active player 580 using the observer 486's messaging platform identity via messaging platform client 582 may be routed to an endpoint at messaging platform interface 414. The messaging platform identity of the observer 456 may be obfuscated (e.g., by tagging the message with an in-game identity of the observer 456 as the source of the message), and the message may be sent to the active player 450 via an appropriate in-game communications channel. The active player 450 may respond to the message via the in-game communications channel. The messaging platform interface 414 receives the out-of-band response on the in-game communications channel, maps the destination of the response to the messaging platform identity of the observer 456, tags the response with a messaging platform identity for the sending player 450, and sends the response to the messaging platform client 482 on device 480.

Figure 4C:
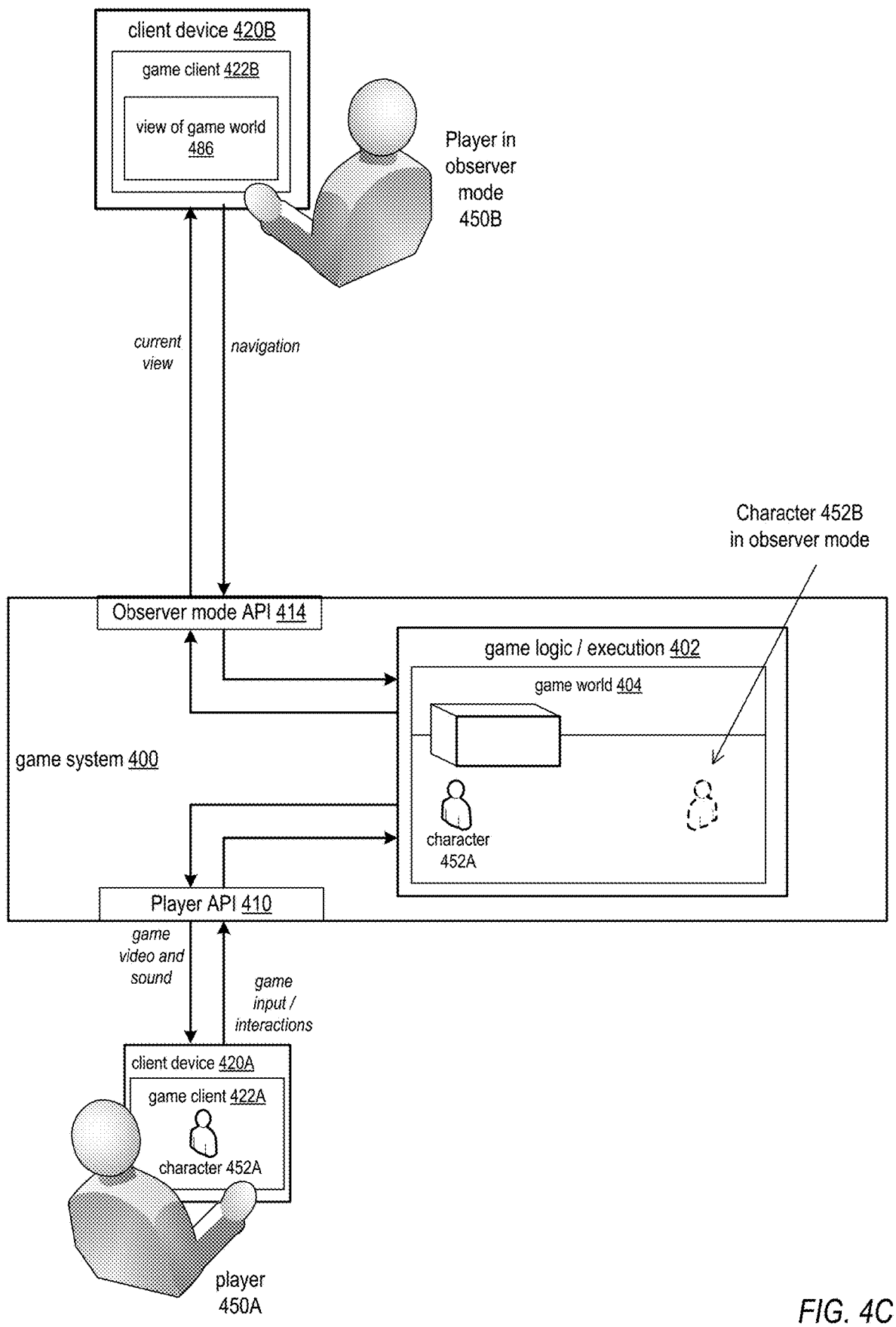
FIG. 4C illustrates an active player in "observer mode" in a multiplayer game system, according to some embodiments.

FIG. 4C illustrates an active player in "observer mode" in a multiplayer game system, according to some embodiments. In some embodiments, a game system 400 may provide an "observer mode" that can be entered by an active player 450B that makes their in-game character 452B invisible to other characters 452A and players 450A in the game world and provides navigation controls via an observer mode API 414 that allows the player 450B to move their character 452B about in the game world 404 to view the game world from different locations. Thus, "observer mode" may be integrated as a part of game play in some game systems.

In some embodiments, a character 452B in observer mode may be subject to the "physics" of the game world 404; that is, the character 452B in observer mode is invisible, but may only move about in the game world 404 as would a normal character 452, and the character 452B may be subject to physical interactions (e.g., can be touched, injured, etc.). However, in some embodiments, a character 452B in observer mode may not be subject to at least some of physics of the game world 404. In these embodiments, for example, the character 452B in observer mode may jump to other locations, move at any speed (not subject to the movement limitations of a normal character 452), and may not be subject to physical interactions (cannot be touched, injured, etc.). As an example, the ability to go into observer mode may be provided by the game system 400 as an attribute of a particular type of character 452. As another example, the ability to go into observer mode may be provided by the game system 400 as a special power that can be won, purchased, or otherwise obtained through game play. In some embodiments, players 450 that are participating in a game session may choose to allow or disallow observer mode for characters 452 in the game session.

In some embodiments, players 450 in a game world 404 may have or may obtain an attribute that allows the players 450 to see or otherwise detect characters 452 in observer mode in the game world 404. In some embodiments, players 450 in a game world 404 may have or may obtain an attribute that allows the players 450 to shield or block characters 452 in observer mode from seeing or entering portions of the game world 404; for example, a "shield camp from players in observer mode" attribute may be obtained by a team of players 450 so that they can block players 450 from other teams from entering and/or viewing their camp when in observer mode.

Figure 5:
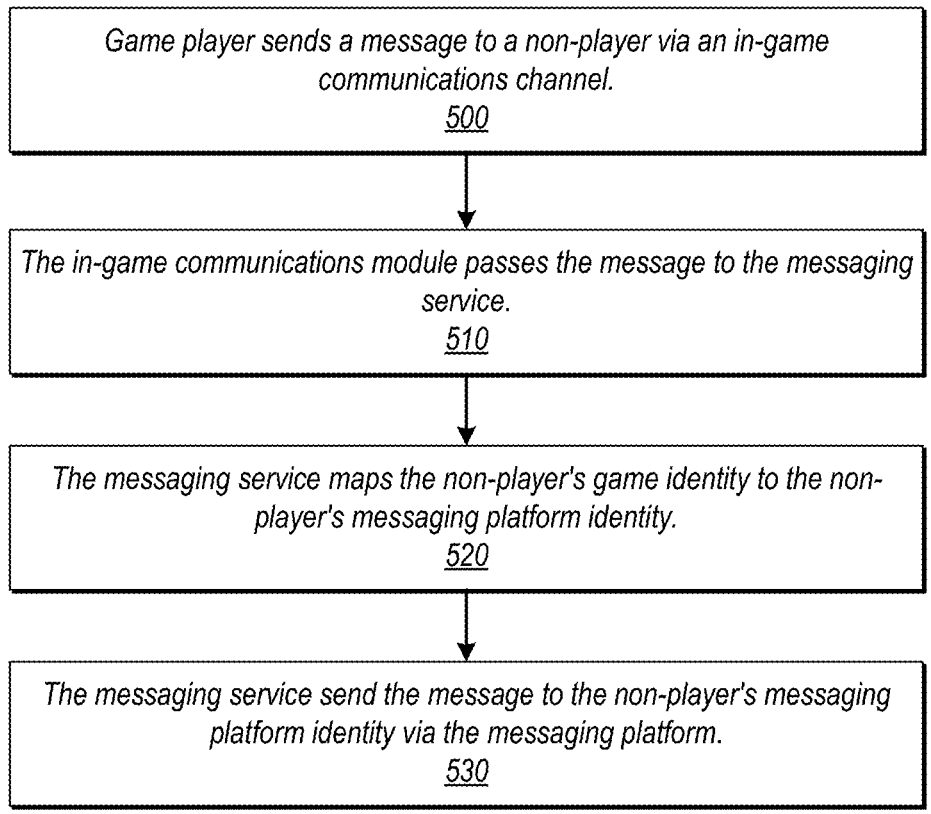
FIG. 5 is a flowchart of a method in which an active player in a multiplayer game system messages an inactive via the messaging service, according to some embodiments.

FIG. 5 is a flowchart of a method in which an active player in a multiplayer game system messages an inactive via the messaging service, according to some embodiments. As indicated at 500, an active game player sends a message to a non-player via an in-game communications channel. As indicated at 510, the in-game communications module passes the message to the messaging service. As indicated at 520, the messaging service maps the non-player's game identity to the non-player's messaging platform identity. As indicated at 530, the messaging service sends the message to the non-player's messaging platform identity via the messaging platform.

Figure 6:
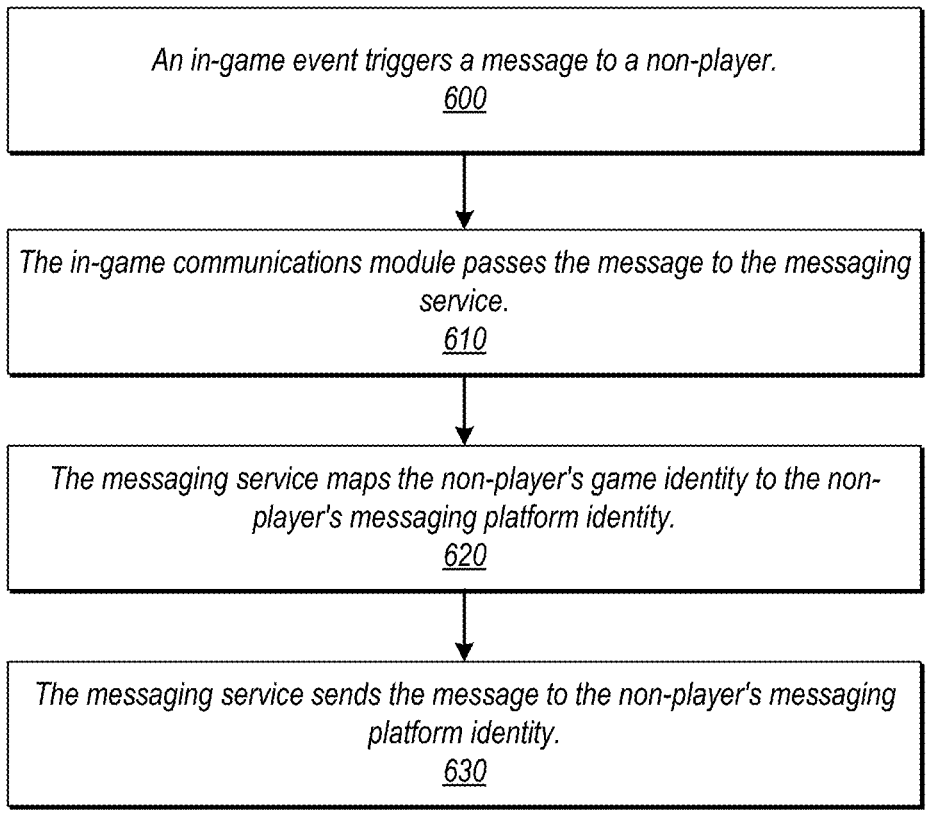
FIG. 6 is a flowchart of a method in which an in-game event in a multiplayer game system triggers a message to an inactive player via the messaging service, according to some embodiments.

In some embodiments, in addition to messages to non-players generated by active players, messages to non-players may be generated by in-game events. FIG. 6 is a flowchart of a method in which an in-game event in a multiplayer game system triggers a message to a non-player via the messaging service, according to some embodiments. As indicated at 600, an in-game event triggers a message to a non-player. As indicated at 610, the in-game communications module passes the message to the messaging service. As indicated at 560, the messaging service maps the non-player's game identity to the non-player's messaging platform identity. As indicated at 630, the messaging service sends the message to the non-player's messaging platform identity via the messaging platform.

Figure 7:
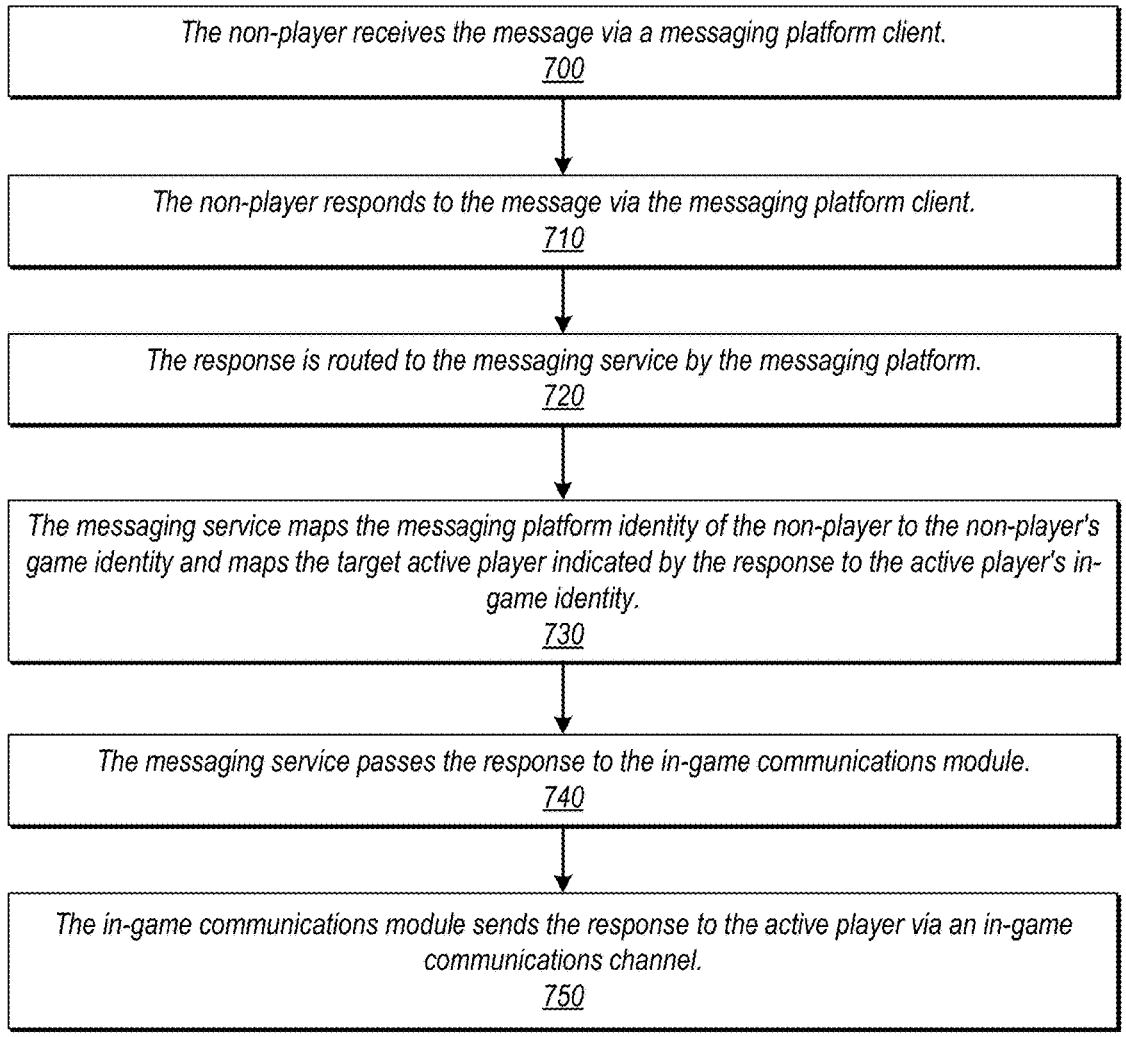
FIG. 7 is a flowchart of a method in which a non-player receives a message from and responds to an active player in a multiplayer game system via the messaging service, according to some embodiments.

FIG. 7 is a flowchart of a method in which an inactive player receives a message from and responds to an active player in a multiplayer game system via the messaging service, according to some embodiments. As indicated at 700, the non-player receives the message via a messaging platform client. As indicated at 710, the non-player responds to the message via the messaging platform client. Note that a response may be optional. As indicated at 720, the response is routed to the messaging service by the messaging platform. As indicated at 730, the messaging service maps the messaging platform identity of the non-player indicated by the response to the non-player's game identity and maps the target active player indicated by the response to the active player's in-game identity. As indicated at 740, the messaging service passes the response to the in-game communications module. As indicated at 750, the in-game communications module sends the response to the active player via an in-game communications channel.

Figure 8:
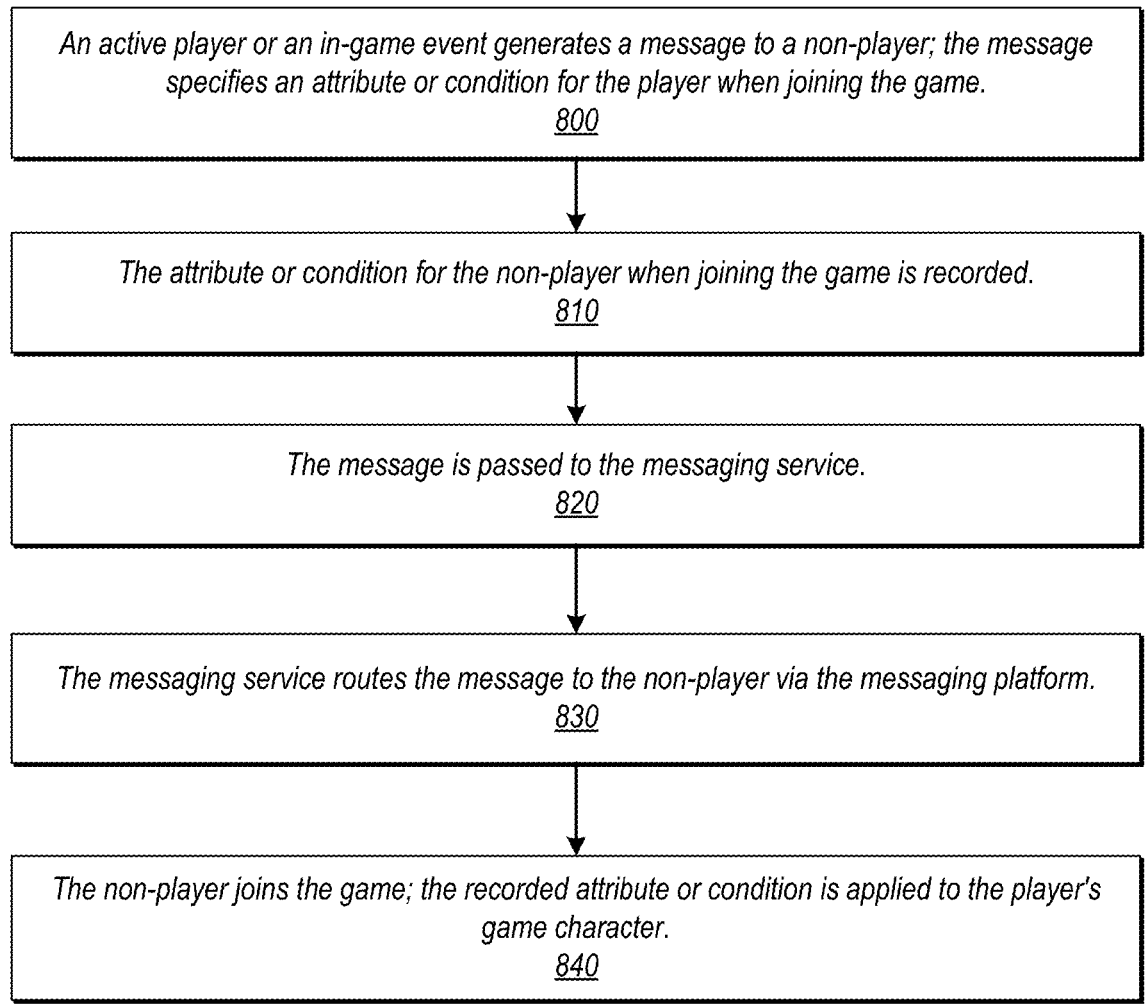
FIG. 8 is a flowchart of a method in which attributes or conditions specified in a message sent to a non-player are applied to the player when joining the game in response to the message, according to some embodiments.

FIG. 8 is a flowchart of a method in which attributes or conditions specified in a message sent to an inactive player are applied to the player when joining the game in response to the message, according to some embodiments. As indicated at 800, an active player or an in-game event generates a message to a non-player; the message specifies an attribute or condition for the non-player when joining the game. As indicated at 810, the attribute or condition for the non-player when joining the game is recorded by the game system (or alternatively by the messaging service). As indicated at 820, the message is passed to the messaging service. As indicated at 830, the messaging service sends the message to a messaging platform identity of the non-player. As indicated at 840, the non-player joins the game; the recorded attribute or condition is applied to the player's game character.

FIG. 9 illustrates identity mapping for players in a multiplayer game system, according to some embodiments. In some embodiments, players may provide their contact information (e.g., cell phone number, email address, messaging platform identities, etc.) and their in-game identities (e.g., character names) to the game system or to the messaging service, for example during a registration process for the game or for a registration process for the messaging service. As shown in FIG. 9, the in-game identities and contact information for the players may be stored in an identity mapping 962 store. In some embodiments, if the contact information was provided to the game system by the players, the game system may provide the information to the messaging service. The messaging service may use the player information in identity mapping 962 store to map player's in-game identities to the player's messaging platform identities, and vice versa, when sending messages to and receiving messages from non-players via various messaging platforms.

Figure 10:
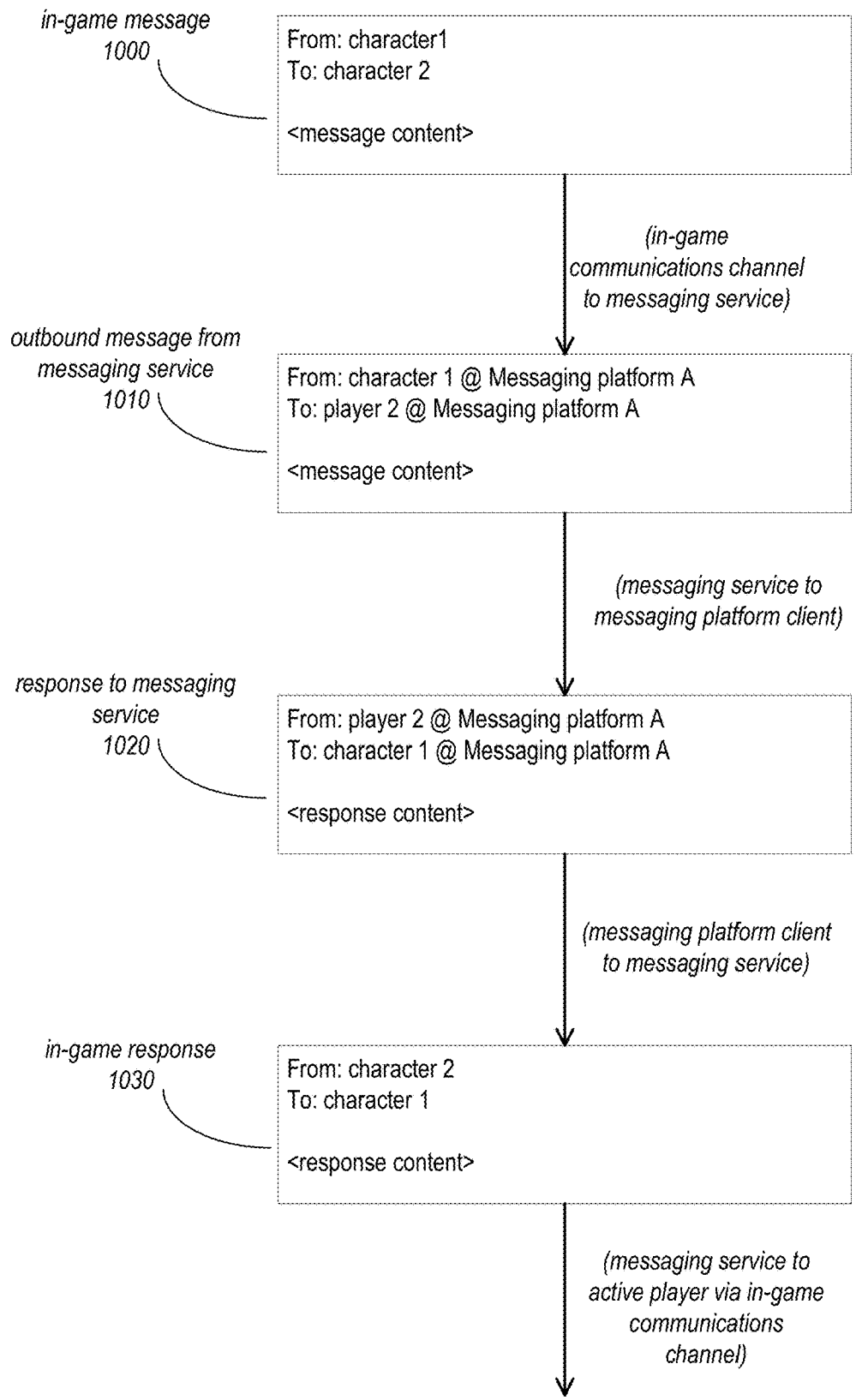
FIG. 10 illustrates obfuscating the identities of players in messages when messaging between in-game and out-of-game players, according to some embodiments.

FIG. 10 illustrates obfuscating or masking the identities of players in messages when messaging between in-game and out-of-game players, according to some embodiments. FIG. 10 shows a message 1000 sent via an in-game player to another player's character in the game world via an in-game communications channel. The message 1000 is tagged with the players' in-game identities (e.g., their character names, "character 1" and "character 2"). Upon identifying that the target player (character 2) is not currently an active player (i.e., is a non-player), the message 1000 is forwarded to the messaging service, which generates an outbound message 1010 from the message 1000. The messaging service maps the in-game identity of the non-player ("character 2") to a messaging platform identity of the non-player ("player 2 @ Messaging platform A") and changes the message destination to the messaging platform identity of the non-player. The messaging service also changes the source of the message 1010 to an obfuscated messaging platform identity for the active player (for example, "character 1 @ Messaging platform A"). The active player's real-world identity (for example, the active player's actual messaging platform identity ("player 1 @ Messaging platform A"), telephone number, etc.) is not used in the messaging platform message sent to the non-player's messaging platform identity so that the active player's actual identity is "masked" from the non-player's perspective. The messaging service may also further modify the message 1010 according to the messaging platform protocol. In some embodiments, the messaging service may register "character 1 @ Messaging platform A" as a temporary endpoint with the respective messaging platform. The message 1010 is then sent as an outbound message from endpoint "character 1 @ Messaging platform A" at the messaging service to be routed to "player 2 @ Messaging platform A" at the non-player's messaging platform client on a personal/mobile device of the non-player.

The non-player may send a response 1020 to the message 1010 via their messaging platform client. The source of the message is the messaging platform identity of the non-player ("player 2 @ Messaging platform A"), and the destination of the message is the messaging platform identity for the active player ("character 1 @ Messaging platform A") that was provided by the messaging service. The messaging service maps the messaging platform identity of the non-player ("player 2 @ Messaging platform A") to the in-game identity of the non-player ("character 2") and changes the response 1020 source to the in-game identity of the non-player ("character 2"). The messaging service also changes the destination of the response 1020 to the in-game identity of the active player ("character 1"). The messaging service may also further modify the response 1020 according to an in-game communications protocol. The response 1020 may then be sent to the active player (player 1) via an in-game communications channel.

As noted above, the active player's real-world identity is not used in the messaging platform message sent to the non-player's messaging platform identity so that the active player's actual identity is "masked" from the non-player's perspective. An active player in the game may wish to message people outside of the game while maintaining anonymity and protecting their real-world contact information from people that they may not know or trust. However, in some cases, an active player may know or trust the person they are messaging. Thus, in some embodiments, the messaging service may provide an option whereby an active player may choose to have their actual contact information revealed to the person receiving the messages so that they know who the message is from. In these embodiments, if an active player sends a message to a person outside of the game for which the active player has indicated their real-world identity may be revealed, the messaging service may use the active player's actual messaging platform identity (e.g., "player 1@ Messaging platform A") as the source identity of the message sent to the person outside of the game.

FIGS. 11A and 11B illustrate game system interfaces for messaging inactive players or other persons outside the game, according to some embodiments. As shown in FIG. 11A, some embodiments, the game system may provide an in-game interface 1100 that may include one or more of, but is not limited to, an interface element 1110 via which an active player can select or enter the in-game identity of another player not currently active in the game (or, alternatively, an identity of a person who is not currently registered with the game system), an interface element 1120 via which an active player can select a predefined message (e.g., from a pop-up list of predefined messages), an interface element 1130 via which an active player can enter a message, one or more interface elements 1140 via which an active player can optionally specify additions or attachments to the message, one or more interface elements 1150 via which an active player can optionally specify conditions to be applied to an inactive player's character when entering the game in response to the message (e.g., a location at which the character should appear and/or a mode that the character should be in), and an interface element 1160 via which an active player can send the message to the inactive player. The messaging service may then map the in-game identity of the inactive player to one or more messaging platform identities of the inactive player, and forward the message (with obfuscated identities) to the inactive player via one or more messaging platforms. In some embodiments, the interface 1100 may also include an interface element that allows an active player to enter an identity of a person who is not a registered player with the game to send a message from within the game to that person. For example, the active player may enter a messaging platform identifier, for example an email address or a telephone number, of a friend that they want to message from within the game (e.g., to invite the friend to register as a player in the game).

FIG. 11B illustrates an alternative interface 1190 in which an in-game player may enter a message "command" that is interpreted by the messaging service or game system to generate a message to a person not currently participating in the game. The game system or messaging service may provide a syntax via which the active player can specify message text, a target for the message (e.g., a player not currently in the game or, alternatively, a person who is not currently registered with the game system), and attachments or conditions to be applied to the message. While FIG. 11B shows that a message command may be entered via text input, in some embodiments a message command may instead or also be entered via voice input.

While FIGS. 11A and 11B indicate that a message can be sent from an in-game player to a player not in the game or to a person not currently registered with the game system, in some embodiments an in-game player may send the message to two or more person not currently participating in the game, or to other active player(s) in the game in addition to persons not currently participating in the game.

FIG. 12 illustrates a messaging service that serves as an interface between closed communications systems such as multiplayer game systems and messaging platforms, according to some embodiments. While embodiments of a messaging service are primarily described herein that provide out-of-band communications to active players in a game system so that the active players can message inactive players, embodiments of the messaging service may be applied in any closed communication system 1200 to allow active participants within that system 1200 to message persons outside that system 1200 via messaging platform(s) 1270 while obfuscating the identities and contact information of the persons participating in the communications. In some embodiments, the messaging service 1260 may expose an application programming interface (API) 1265 to closed communications system(s) 1200 so that developers can interface their in-system communications to one or more messaging platforms 1270, and may interface 1267 with the messaging platform 1270 APIs 1272 to provide one-way or two-way out-of-band communications between active participants in closed communications system 1200 using in-system communications channels and non-participants using messaging platform clients 1282 on personal/mobile devices such as smartphones, pad or tablet devices, and notebook computers. Embodiments of the messaging service 1260 may thus act as a bridge between in-system communications modules that implement in-system communications channels and various public (standardized communications protocol) or private (proprietary communications protocol) messaging platforms 1270. Embodiments may also obfuscate the identities of the participants and non-participants in inbound and outbound messages so that the senders' and receivers' personal information is not exposed. However, in some embodiments, the participants may be provided with an option whereby their personal information may be exposed to non-participants if so desired.

Messaging service 1260 may enable active participants in a closed communication system 1200 to communicate with people that are not currently participants via one or more messaging platforms 1270 (e.g., short message service (SMS) platforms, multimedia messaging service (MMS) platforms, Rich Communication Services (RCS) platforms, Facebook Messenger®, instant messaging (IM) platforms such as AIM®, Voice Over Internet Protocol (VOIP) platforms such as Skype®, email platforms such as Gmail®, etc.). In some embodiments, the messaging service 1260 may expose an application programming interface (API) 1272 to closed system(s) 1200 so that developers can interface their in-system communications to one or more messaging platforms 1270, and may interface with the messaging platform 1270 APIs 1272 via an interface 1267 to provide one-way or two-way out-of-band communications between participants using in-system communications channels and non-participants using messaging platform clients 1282 on personal/mobile devices such as smartphones, pad or tablet devices, and notebook computers. Embodiments of the messaging service 1260 may act as a bridge between in-system communications modules that implement in-system communications channels and various public (standardized communications protocol) or private (proprietary communications protocol) messaging platforms 1270. Embodiments may also obfuscate the identities of the active participants so that the participants' personal information is not exposed to non-participants unless the participants choose to expose the information.

In some embodiments, the messaging service 1260 may be implemented as a service that is separate from the closed communication system 1200, for example as a provider network service as illustrated in FIG. 16, and thus may be accessed by multiple systems 1200 to provide out-of-band communications to active participants in the respective systems 1200. Alternatively, the messaging service 1260 may be implemented as a component of a closed communication system 1200 to provide out-of-band communications to active participants in that system 1200.

In some embodiments, participants may provide their contact information (e.g., cell phone number, email address, messaging platform identities, etc.) and their in-game identities to the system 1200 or to the messaging service 1260, for example during a registration process with the system 200 or during a registration process with the messaging service 1260. The in-system identities and contact information for the participants may be stored in an identity mapping 1262 store. If the contact information was provided via the system 1200, the system 1200 may forward the information to the messaging service 1260.

In some embodiments, an active participant in closed communication system 1200 may send a message to another person's in-system identity via an in-system communications channel. Upon detecting that a person to which a message is sent is not currently active (i.e., is a non-participant), the message may be forwarded to the messaging service 1260. A message/response routing 1266 component of the messaging service 1260 may map the person's in-system identity to one or more messaging platform 1270 identities using the identity mapping 1262 data, assign a messaging platform identity to the sender of the message that masks the in-system identity of the sender of the message, and forward the message from the messaging platform identity assigned to the sender to the non-participant at their messaging platform identity(s) via one or more messaging platforms 1270. The message may be received by the non-participant on a messaging platform client 1282 executing on a personal/mobile device, for example a smartphone, tablet or pad device, or notebook computer. The non-participant may respond to the message via the messaging platform(s) 1270, and/or may act based on the message.

If the non-participant responds to the message via the messaging platform 1270, the response is routed to the messaging service 1260 by the messaging platform 1270. The message/response routing 1266 component of the messaging service 1260 maps the messaging platform identity of the non-participant to the person's in-system identity using the identity mapping 1262 data, and passes the response to a communications module of the closed communication system 1200. The response indicates the non-participant's in-system identity as the source of the response. The communications module then sends the response to the original sender of the message via an in-system communications channel. The real identities of the participants and non-participants may thus be obfuscated so that a person's real identity and personal contact information are not exposed to other persons. However, in some embodiments, participants may be provided with an option whereby their personal information may be exposed to non-participants if so desired.

In some embodiments, a message sent to a non-participant may include additional information, which in some cases may be automatically added or attached to the outbound message by the system 1200 or the messaging service 1260. Examples of additional information that may be added or attached to a message may include one or more of, but is not limited to, a location or status of an active participant within the closed communication system 1200, a link to join the closed communication system 1200, a virtual object to be given to the non-participant, and one or more attributes or conditions to be applied to the non-participant upon joining the system 1200.

In some embodiments, system 1200 and/or messaging service 1260 may store message tracking 1264 information. Message tracking 1264 information may, for example, include information tracking the state of messages sent to non-participants via messaging platform(s) 1270. Message tracking 1264 information may also include information indicating attributes or conditions that were attached to the messages and that are to be applied to a non-participant when next joining the system 1200, or that are to be applied to the non-participant when next joining the system 1200. When the non-participant joins the game, the message tracking 1264 information may be accessed to obtain the attributes or conditions that are to be applied to the person's in-system identity.

In some embodiments, the game system 1200 may provide an interface via which an active participant can select or otherwise identify a non-participant, select (e.g., from a list of predefined messages) or enter a message, optionally specify additions or attachments to the message, and then send the message to the non-participant. The message may be sent to the messaging service 1260, which may then map the identity of the non-participant to one or more messaging platform identities of the non-participant, and forward the message (with obfuscated identities) to the non-participant via one or more messaging platforms 1270.

In some embodiments, the system 1200 may provide an interface via which an active participant can send a message to a group of participants in the system 1200. If one or more of the participants in the group are not currently participating in the system 1200, the message may be sent to the messaging service 1260, which may then map the in-system identity of the non-participant(s) to one or more messaging platform identities of the non-participant(s), and forward the message (with obfuscated identities) to the non-participant(s) via one or more messaging platforms 1270. A non-participant may, but does not necessarily, respond to the message via a messaging platform 1270. If the non-participant(s) does respond to the message, the response may be forwarded to one or more, or all, of the other participants in the group to which the original message was sent.

In some embodiments, an in-system event may trigger a message to one or more participants, for example members of a team or group. Upon detecting that a person is not an active participant (e.g., is not currently logged on to the closed communication system 1200), an in-system communications module passes the message to the messaging service 1260. The messaging service 1260 maps the person's in-system identity to the person's messaging platform identity(s), and then sends the message to the person via the messaging platform(s) 1270.

Figure 13:
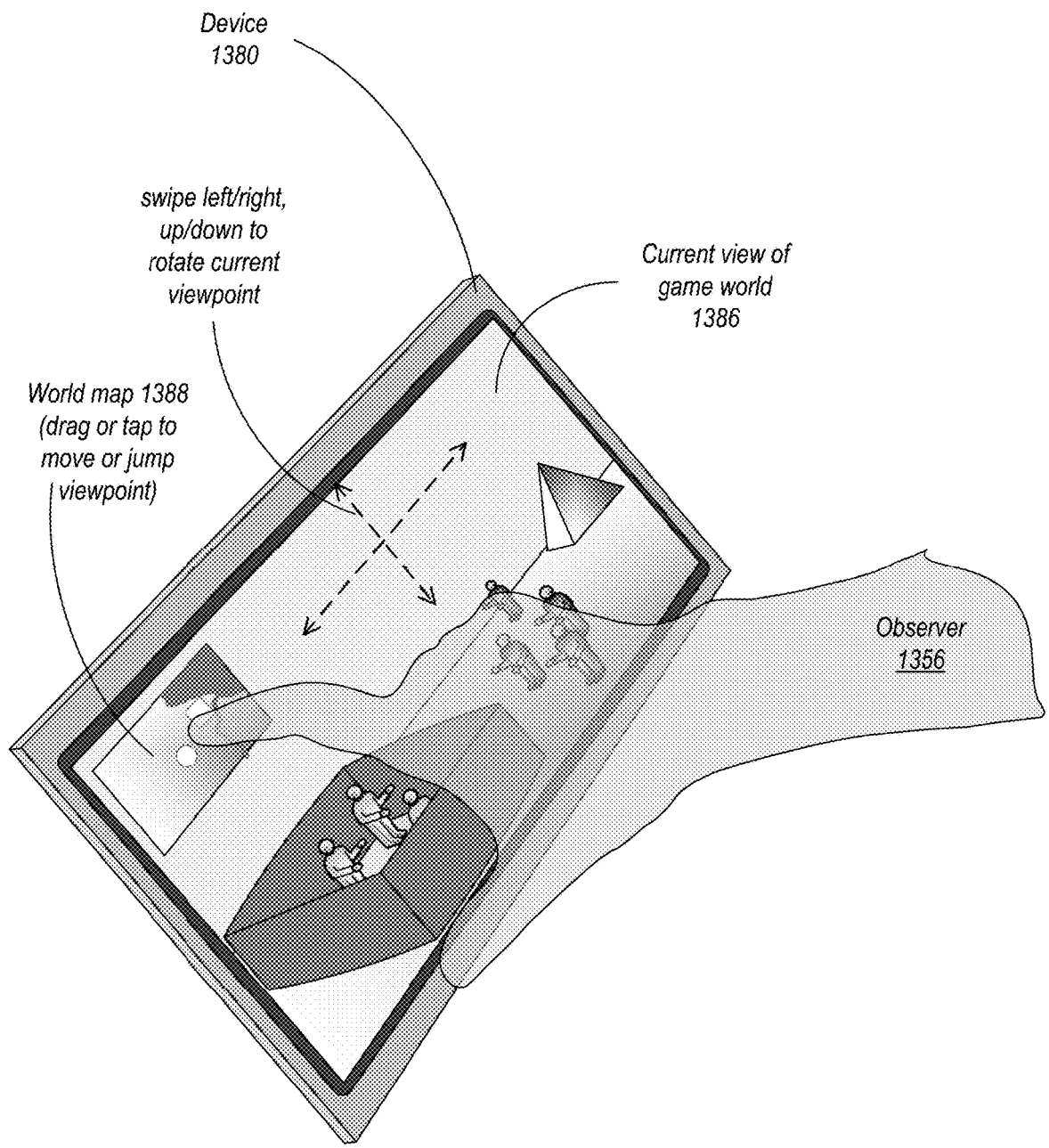
FIG. 13 illustrates using a viewing application on a mobile device to view a game world in a multiplayer game system as an observer, according to some embodiments.

FIG. 13 graphically illustrates a user using a viewing application on a mobile device to view a game world in a multiplayer game system as an observer, according to some embodiments. Note that FIG. 13 is given as an example, and is not intended to be limiting. A game system may provide an "observer mode" that enables a user to access a virtual game world generated by game logic/execution of a game system via a web browser or other viewing application so that the user (referred to as an observer 1356) can view and navigate within the game world 1386 from a mobile/personal device 1380 (e.g., a smartphone, tablet/pad device, notebook computer, or cloud-based laptop computer) while not actively participating as a player in the game. An observer 1356 may be a player that is not currently playing the game via a game client, or may be a person who wants to view and explore the game world but is not a player.

When the observer 1356 accesses the game world in observer mode, a view 1386 of the game world is rendered by the game system from a viewpoint of the observer's character; the observer's character does not correspond to any character in the game world and the observer is not visible to the player(s) or character(s) in the game world. An initial location of the observer's character in the game world may be specified by the observer (e.g., by selecting the viewpoint on a map 1388 of the game world), or alternatively may default to a predetermined initial location.

The rendered view 1386 of the game world from the viewpoint of the observer's character may be streamed to and displayed by a viewing application (e.g., a web browser or other application that supports receiving and displaying streamed video) on a personal device 1380 (e.g., tablet device, smartphone, notebook, etc.) of the observer 1356. Navigation inputs to the personal device 1380, for example gestures made via a touch-enabled device 1380, are sent back to the game system, and allow the observer's character to be moved freely within the game world under control of the observer 1356. For example, in some embodiments, the observer 1356 may tap on a world map 1388 to jump the observer's character to different locations in the game world, may drag on the map 1388 to move the observer's character through the game world at different speeds, or using different modes of transport, including speeds and/or modes of transport that are not accessible to players via game clients, and may swipe left, right, up, or down on the view 1386 of the game world to rotate, tilt, zoom in, or zoom out the viewpoint of the observer's character. Note that other methods for providing navigation controls may be used in various embodiments and/or for different devices 1380 or viewing applications.

In some embodiments the game system may provide observer mode settings via which players may allow or disallow observers 1356 in a game world or in portions of the game world. For example, in some games, a player or team of players may "cloak" an area in the game world that they control so that observers from other teams cannot observe their area. As another example, in some games, players that are going to participate in a particular game session may choose to allow or disallow observer mode for that game session.

In some embodiments, players in a game world may have or may obtain an attribute that allows the players to see or otherwise detect an observer 1356 in the game world. In some embodiments, a player may have or may obtain an attribute that makes the player's character invisible to observers 1356 in the game world.

In some embodiments, an observer 1356 may communicate with active players in the game world via one or more messaging platforms, for example as illustrated in FIG. 4B. As an example, in some embodiments, an observer 1356 may tap on the character of a player in view 1386 to open a messaging platform client on device 1380 via which the observer 1356 may send a message to the selected player.

FIG. 14A is a high-level flowchart of a method for viewing a game world in observer mode in a multiplayer game system, according to some embodiments. As indicated at 1400, a person enters an active game world as an observer via a viewing application on a personal/mobile device (e.g., (e.g., a smartphone, tablet/pad device, notebook computer, or cloud-based laptop computer). An initial location of an observer's character in the game world may be specified by the observer (e.g., by selecting the location on a map of the game world), or alternatively the location may default to a predetermined initial location (e.g., an observer spawn point). In some embodiments, the observer may select an initial location for the observer's character using navigation controls provided via the viewing application. In some embodiments, the observer's character is not visible to active players or characters. An observer may be a registered player that is not currently playing the game via a game client, or may be a person who wants to view and explore the game world but is not a registered player.

As indicated at 1410, the observer may move about in the game world using the navigation controls to change their location in the game world. Navigation inputs to the navigation controls are sent to the game system. As indicated at 1420, the game system moves the observer's character through the game world in response to the navigation inputs and renders and streams a view of the game world from the current viewpoint of the observer's character to the viewing application on the personal/mobile device of the observer. Note that, in some embodiments, the rendered view of the game world that is streamed to the observer's viewing application may be rendered at a different resolution (e.g., lower or higher) than would be provided to a game client executing on a game system. The navigation inputs may allow the observer's character to be moved freely within the game world under control of the observer. For example, the observer may use navigation controls to jump the character to different locations in the game world, to move the character through the game world at different speeds, or using different modes of transport, including speeds or modes of transport that are not accessible to active players via game clients, and to rotate, tilt, zoom in, or zoom out the viewpoint of the observer's character.

Figure 14B:
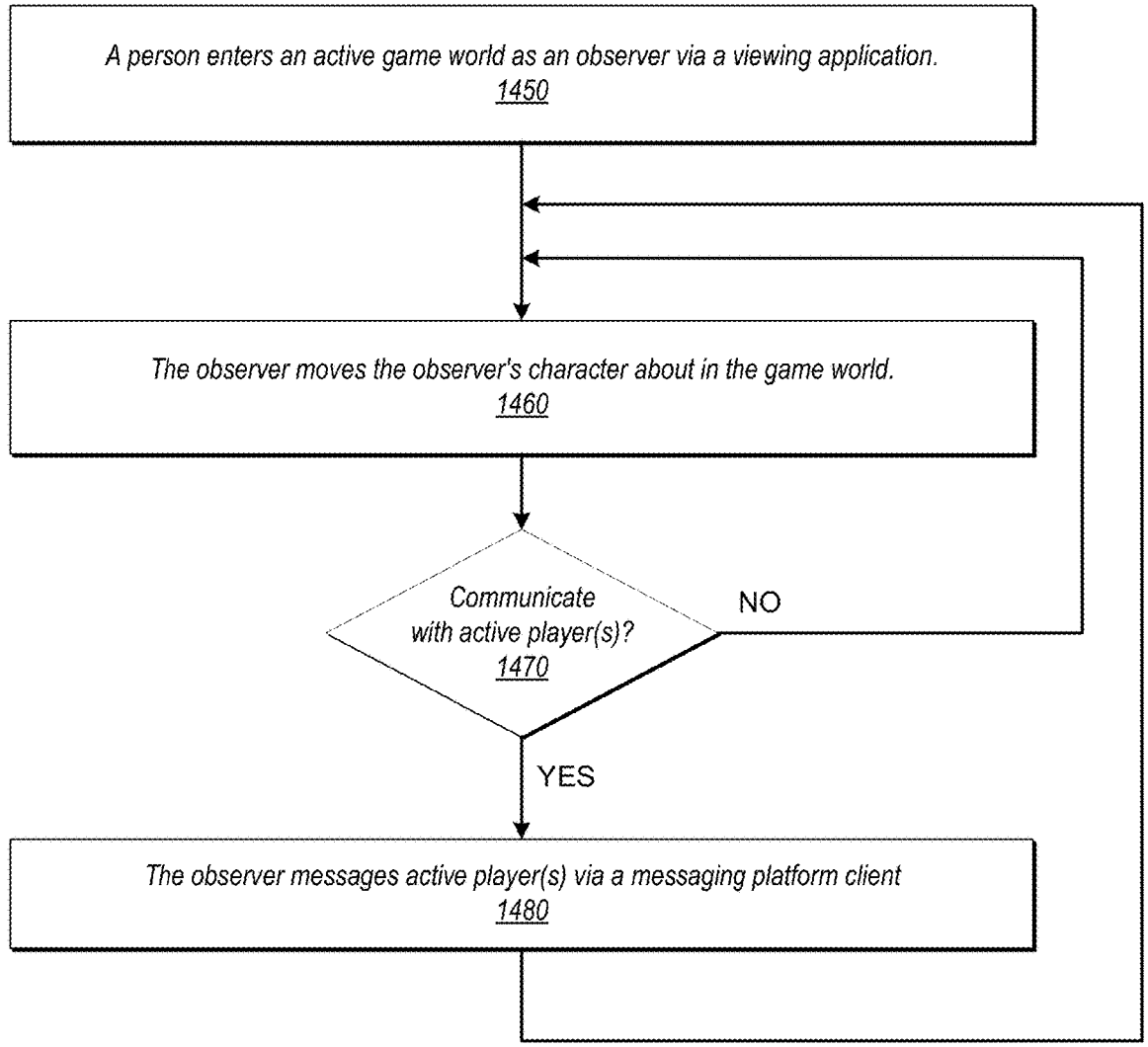
FIG. 14B is a flowchart of a method for viewing a game world in observer mode and communicating with players in the game world in a multiplayer game system, according to some embodiments.

FIG. 14B is a high-level flowchart of a method for viewing a game world in observer mode and communicating with players in the game world in a multiplayer game system, according to some embodiments. As indicated at 1450, a person enters an active game world as an observer via a viewing application on a personal/mobile device (e.g., (e.g., a smartphone, tablet/pad device, notebook computer, or cloud-based laptop computer). As indicated at 1460, the observer may move their character about in the game. The game system renders and streams a view of the game world from the current viewpoint of the observer's character to the viewing application on the personal/mobile device of the observer. At 1470, if the observer chooses to communicate with active player(s), the observer may message the active player(s) via a messaging platform client on their personal/mobile device as indicated at 1480. A messaging service as described herein may facilitate routing of the observer's messaging platform messages to the active player(s) via an in-game communications channel. The in-game players may respond to the messages via the in-game communications channel; the messaging service may facilitate routing of the responses to the observer's messaging platform client.

Figure 15:
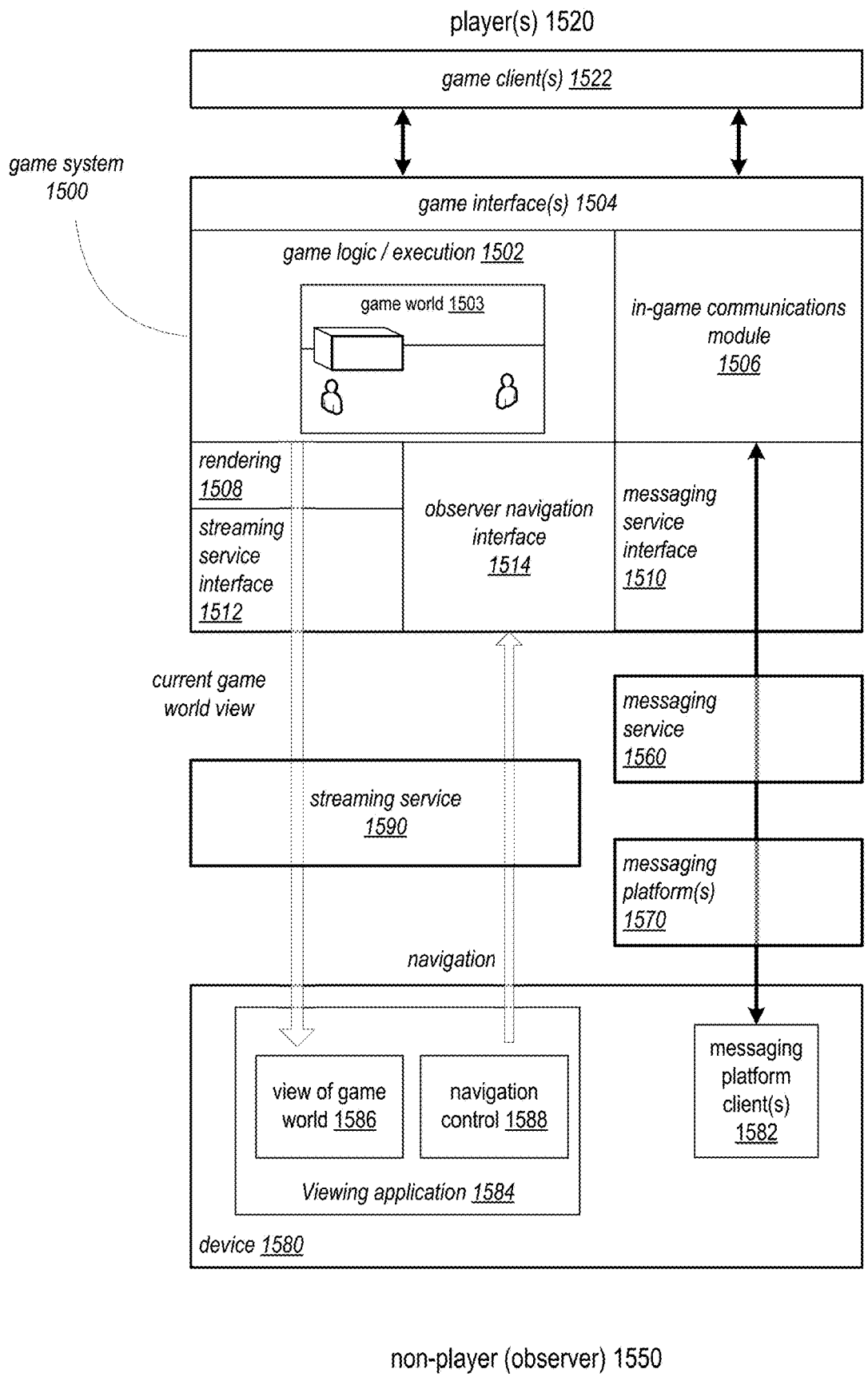
FIG. 15 illustrates an example network-based multiplayer gaming environment in which a view of the active game world and navigation controls are provided to an observer via a viewing application on a device, according to some embodiments.

FIG. 15 illustrates an example network-based multiplayer gaming environment in which a view of the active game world and navigation controls are provided to an observer via a viewing application on a device, according to some embodiments. In these embodiments, a streaming service 1590 is used to provide rendered video and audio of the game world from a viewpoint of the observer's character to a viewing application such as a web browser. Game system 1500 may include a game logic/execution 1502 component, front-end game system interface(s) 1504 for transmitting game video and sound to and receiving game input from game clients 1522. Game logic/execution 1502 component may generate a game world 1503 that includes the game session's context, characters, and environment. Based upon inputs to and interactions with the game world 1503 by players(s) 1522 via game client(s) 1522 and game system interface(s) 1504, and on other game factors (e.g., scripted events and/or a randomness component), a game session progresses along a timeline, with the game world 1503 being modified and updated by game logic/execution 1502 component accordingly.

Game system 1500 may further include a 2D or 3D rendering 1508 component, a streaming service interface 1512, and an observer navigation interface 1514. A non-player 1550 may access game system 1500 from a device 1580 via observer navigation interface 1514 (e.g., via a web page using a web browser) to access the game world 1503 in observer mode. An initial location of the observer's character may be specified by the non-player 1550, or alternatively the location may default to a predetermined initial location (e.g., an observer spawn point). Rendering 1508 component of game system 1500 may render a 2D or 3D representation or view of the game world 1503 from the current viewpoint of the observer's character. Streaming service interface 1512 may generate video from the rendering of the game world 1503 and stream the video and accompanying sound to the viewing application 1584 on device 1580 according to a streaming service protocol. At device 1580, the viewing application 1584 receives and displays the video (and plays the sound) of the game world 1503 from the current viewpoint of the observer's character. The observer 1550 may provide a navigation input via a navigation control 1588 component of the viewing application 1584 to cause the observer's character to move within the game world 1503, for example jumping to different locations, moving at different speeds, rotating, tilting, etc. The navigation inputs may be sent as metadata via the streaming service 1590 to the rendering 1508 component to render a view of the game world 1503 from the perspective of the observer's character as it moves, or alternatively the navigation inputs may be sent as metadata via the streaming service 1590 to the observer navigation interface 1514, which in turn directs the rendering 1508 component to render a view of the game world 1503 from the perspective of the observer's character as it moves through the game world.

Game system 1500 may further include an in-game communications module 1506 and a messaging service interface 1510. Active players 1520 may communicate with each other using voice and/or text via in-game communications channels provided by in-game communications module 1506. In some embodiments, an observer 1580 may communicate with active player(s) 1520 via a messaging platform client 1582 (e.g., an email application, text messaging application, VOIP application, etc.) on device 1580. A message sent by observer 1580 to player(s) 1520 using messaging platform client 1582 may be routed to an endpoint at messaging service 1560 by the messaging platform 1570. Messaging service 1560 may obfuscate the real-world identity of the observer 1550 (e.g., by tagging the message with an in-game identity of the observer 1550) and send the message to the in-game communications module 1506 via messaging service interface 1510; the message is then provided to the target player(s) 1520 via an appropriate in-game communications channel. An active player 1520 may respond to the message via an in-game communications channel; the response is routed to the messaging service 1560, which forwards the response to the observer 1550 via the messaging platform 1570.

Messaging Service Messaging Platform Endpoints

To send messages to and receive messages from messaging platform clients, the messaging service may maintain or obtain one or more messaging platform endpoints for the sources of the message (e.g., active players in the game, or the game itself if the message is generated by an event and not by an active player). There are several alternative methods that may be used in embodiments to manage the messaging platform endpoints.

In a first method, the messaging service obtains and maintains a single messaging platform endpoint for a given messaging platform (e.g., messaging_service@ platform_A). Messages sent from this endpoint to a messaging platform endpoint at a messaging platform client may be tagged with metadata indicating the source of the message (e.g., the in-game identity (character name) of an active player that sent the message, or the game if the message was triggered by an event). Information about the messages may be stored in a message tracking store, for example as illustrated in FIG. 2, and used to maintain state of the messages.

In a second method, the messaging service may obtain a temporary messaging platform endpoint (e.g., character_A@platform_A) for sending a message from an active player to a messaging platform endpoint at a messaging platform client. The temporary messaging platform endpoint may expire after a specified time period.

In a third method, messaging platform endpoints may be obtained for and assigned to players by the messaging service when the players enter the game (e.g., character_A@platform_A, character_A@platform_B, character_B@platform_A, character_B@platform_B, etc.), and may persist until the players exit the game.

Example Gaming Environments

FIG. 16 illustrates an example network-based multiplayer gaming environment that supports in-game to out-of-game messaging and observer mode, according to some embodiments. Embodiments of game systems that implement the methods and apparatus for out-of-band communications and game observing as described herein in reference to FIGS. 1 through 15 may be implemented in the context of a service provider that provides virtualized resources (e.g., virtualized computing resources, virtualized storage resources, virtualized database (DB) resources, etc.) on a provider network to clients of the service provider, as illustrated in FIG. 16. Virtualized resource instances may be provisioned via one or more provider network services 1610, and may be rented or leased to the clients of the service provider, for example to a game provider. At least some of the resource instances on the provider network 1600 (e.g., computing resources 1624) may be implemented according to hardware virtualization technology that enables multiple operating systems to run concurrently on a host computer, i.e. as virtual machines (VMs) on the host.

The provider network 1600, via the services 1610, may enable the provisioning of logically isolated sections of the provider network 1600 to particular clients as client private networks on the provider network 1600. At least some of a client's resources instances on the provider network 1600 may be provisioned in the client's private network. For example, in FIG. 16, game system 1620 may be implemented as or in a private network of game provider that is provisioned on provider network 1600 via one or more of the services 1610.

The provider network 1600, via the services 1610, may provide flexible provisioning of resource instances to clients in which virtualized resource instances can be automatically added to or removed from a client's configuration on the provider network 1600 in response to changes in demand or usage, thus enabling a client's implementation on the provider network 1600 to automatically scale to handle computation and/or storage needs. For example, one or more additional computing resources may be automatically added to game system 1620 in response to an increase in player participation in the game implemented by game system 1620; if and when usage drops below a threshold, the computing resources can be removed.

In at least some embodiments, a game provider may access one or more of services 1610 of the provider network 1600 via application programming interfaces (APIs) to the services 1610 to configure a game system 1620 on the provider network 1600, the game system 1620 including multiple virtualized resource instances (e.g., computing resources, storage resources, database resources, etc.).

Services 1610 may include one or more of, but are not limited to, one or more hardware virtualization services for provisioning computing resource, one or more storage virtualization services for provisioning storage resources, and one or more database (DB) services for provisioning DB resources. In some implementations, a game provider may access one or more of these services 1610 via respective APIs to provision and manage respective resource instances in game system 1620. However, in some implementations, a game provider may instead access another service (e.g., messaging service 1612 or streaming service 1616) via an API to the service; the other service may then interact with one or more of the other services 1610 on behalf of the game provider to provision resource instances in the game system 1620.

In some embodiments, the service provider may provide game system services to clients of provider network 1600. Game system services may include one or more services that game provider 1690 may leverage to implement a network-based game as a game system 1620 on provider network 1600. As noted above, the game system services may leverage other services to provision various resources in game system 1620.

In some embodiments, the game system services may include a game backend service for creating, deploying, and managing backend or server-side game components on provider network 1600. In at least some embodiments, the game backend service may manage, for the client, the deployment, scaling, load balancing, monitoring, version management, and fault detection and recovery of the server-side game logic. In at least some embodiments, the game backend service may provide fully managed backend containers for server-side game components.

In some embodiments, the game system services may include a game engine service for creating, deploying, and running network-based games, including but not limited to game logic/execution 1622 components and game client 1686 components. The game engine service may include, but is not limited to, 2D and/or 3D game engines and an integrated development environment (IDE) for developing code for the 2D and/or 3D game engines. The game engine service may also include or may leverage the game backend service for provisioning and managing the backend, server-side components. A game provider may leverage one or more of the game system services to implement an online game and to provision the game system 1620 on provider network 1600 for hosting the game. In at least some embodiments, the game engine service may also be leveraged by the game provider to develop and build game clients 1686 for various operating system (OS) platforms on various types of client devices (e.g., tablets, smartphones, desktop/notebook computers, etc.).

The service provider may also provide a streaming service 1616 to clients of provider network 1600. Many consumer devices, such as personal computers, tables, and mobile phones, have hardware and/or software limitations that limit the devices' capabilities as game clients to process and render data in real time. Further, a person that participates in a game may be a "non-player" who is away from their gaming device that includes game client software and hardware, but may wish to view what is going on in the game. In addition, people that are not interested in playing a game may still want to watch what is happening in the game and/or explore the game world provided by the game. In at least some embodiments, a streaming service 1616 may allow views of a resource-intensive game implemented by game system 1620 on provider network 1600 to be rendered on the provider network 1600 and streamed from the provider network 1600 to viewing applications 1684 (e.g., web browsers) implemented on consumer devices such as personal computers, tablets, and mobile phones. In some embodiments, a viewing application may implement a streaming service interface for receiving and processing data received according to the streaming service protocol on a respective device, and for returning metadata (e.g., observer navigation control inputs) to the game system 1620. FIG. 16 illustrates an example network-based gaming environment in which a streaming service 1616 is used to provide rendered game video and sound to viewing applications for non-players in observer mode, according to some embodiments.

The service provider may also provide a messaging service 1612 to clients of provider network 1600. In at least some game systems 1620, active players may communicate via in-game communications 1624 channels. For example, some multiplayer games involve teams of players that compete against each other, and members of a team may communicate via voice or text using an in-game communications 1624 channel dedicated to that team. However, an active player may want to communicate with people that are not currently playing the game, for example a member of their team that is not currently accessing the game via a game client 1686 (referred to as an inactive player or non-player). Messaging service 1612 may enable players within a game to communicate with people that are not currently in the game (e.g., non-players or inactive players) over an intermediate network 1660 such as the Internet via various messaging platforms 1670 (e.g., short message service (SMS) platforms, multimedia messaging service (MMS) platforms, Rich Communication Services (RCS) platforms, Facebook Messenger®, instant messaging (IM) platforms such as AIM®, Voice Over Internet Protocol (VOIP) platforms such as Skype®, email platforms such as Gmail®, etc.). In some embodiments, the messaging service 1612 may expose an application programming interface (API) to game systems 1620 so that game developers can interface their in-game communications 1624 to one or more messaging platforms 1670, and may interface with the messaging platform 1670 APIs to provide one-way or two-way out-of-band communications between active players using in-game communications 1624 channels and persons outside of the game systems (including but not limited to inactive players) using messaging platform clients 1682 on personal/mobile devices such as smartphones, pad or tablet devices, and notebook computers. The messaging service 1612 may act as a bridge between in-game communications 1624 and various public (standardized communications protocol) or private (proprietary communications protocol) messaging platforms 1670. Embodiments of the messaging service 1612 may also obfuscate the identities of the players so that the players' personal information is not exposed.

Referring to FIG. 16, a game provider may develop and deploy an online game as game system 1620, leveraging one or more of services 1610 to configure and provision game system 1620. One or more computing resources may be provisioned and configured to implement game logic/execution 1622. In some embodiments, two or more computing resources may be configured to implement game logic/execution 1622. However, in some embodiments, an instance of game logic/execution 1622 (e.g., a 2D or 3D game engine) may be implemented as or on each of one or more computing resource instances. For example, in some implementations, each computing resource instance may be a virtual machine instance that is spun up from a machine image of the game provider's game engine stored on a storage resource of the provider network 1600.

Storage resources and/or database resources of the provider network 1600 may be configured and provisioned for storing, accessing, and managing game data including but not limited player information. Game system interface(s) 1626 may be configured to provide gaming I/O interfaces and protocols to the game clients 1686. In at least some embodiments, the game system interface(s) 1626 may include or may leverage a streaming service 1616 interface as described above. Game clients 1686 may be developed and built for various operating system (OS) platforms on various types of client devices (e.g., tablets, smartphones, desktop/notebook computers, etc.).

Once game system 1620 is established, players can obtain game clients 1686 from the game provider via one or more channels (e.g., downloading a game client from a game provider website or from a third party website such as an online site for acquiring and downloading various applications, including but not limited to games, for various types of consumer devices including but not limited to mobile devices). One or more players may then participate in game sessions by interacting with game system 1620 via game system interface(s) 1626. Game logic/execution 1622 builds, maintains, and updates the game world for a game session, the players interact in the game world by controlling their characters using game clients 1686 on their client devices.

Illustrative System

In at least some embodiments, a computing device that implements a portion or all of the methods and apparatus for out-of-band communications and for non-player game navigation in computer-based game systems as described herein may include a general-purpose computer system that includes or is configured to access one or more computer-accessible media, such as computer system 4000 illustrated in FIG. 17. In the illustrated embodiment, computer system 4000 includes one or more processors 4010 coupled to a system memory 4020 via an input/output (I/O) interface 4030. Computer system 4000 further includes a network interface 4040 coupled to I/O interface 4030.

In various embodiments, computer system 4000 may be a uniprocessor system including one processor 4010, or a multiprocessor system including several processors 4010 (e.g., two, four, eight, or another suitable number). Processors 4010 may be any suitable processors capable of executing instructions. For example, in various embodiments, processors 4010 may be general-purpose or embedded processors implementing any of a variety of instruction set architectures (ISAs), such as the x86, PowerPC, SPARC, or MIPS ISAs, or any other suitable ISA. In multiprocessor systems, each of processors 4010 may commonly, but not necessarily, implement the same ISA.

System memory 4040 may be configured to store instructions and data accessible by processor(s) 4010. In various embodiments, system memory 4020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for out-of-band communications and for non-player game navigation in computer-based game systems, are shown stored within system memory 4020 as code 4025 and data 4026.

In one embodiment, I/O interface 4030 may be configured to coordinate I/O traffic between processor 4010, system memory 4020, and any peripheral devices in the device, including network interface 4040 or other peripheral interfaces. In some embodiments, I/O interface 4030 may perform any necessary protocol, timing or other data transformations to convert data signals from one component (e.g., system memory 4020) into a format suitable for use by another component (e.g., processor 4010). In some embodiments, I/O interface 4030 may include support for devices attached through various types of peripheral buses, such as a variant of the Peripheral Component Interconnect (PCI) bus standard or the Universal Serial Bus (USB) standard, for example. In some embodiments, the function of I/O interface 4030 may be split into two or more separate components, such as a north bridge and a south bridge, for example. Also, in some embodiments some or all of the functionality of I/O interface 4030, such as an interface to system memory 4020, may be incorporated directly into processor 4010.

Network interface 4040 may be configured to allow data to be exchanged between computer system 4000 and other devices 4060 attached to a network or networks 4050, such as other computer systems or devices as illustrated in FIGS. 1 through 16, for example. In various embodiments, network interface 4040 may support communication via any suitable wired or wireless general data networks, such as types of Ethernet network, for example. Additionally, network interface 4040 may support communication via telecommunications/telephony networks such as analog voice networks or digital fiber communications networks, via storage area networks such as Fibre Channel SANs, or via any other suitable type of network and/or protocol.

In some embodiments, system memory 4020 may be one embodiment of a computer-accessible medium configured to store program instructions and data as described above for FIGS. 1 through 16 for implementing embodiments of methods and apparatus for out-of-band communications and for non-player game navigation in computer-based game systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 4000 via I/O interface 4030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 4000 as system memory 4020 or another type of memory. Further, a computer-accessible medium may include transmission media or signals such as electrical, electromagnetic, or digital signals, conveyed via a communication medium such as a network and/or a wireless link, such as may be implemented via network interface 4040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices that implement a messaging service for a game system executing a game, the messaging service configured to:
   receive, via a messaging platform, a message sent to a messaging platform identity of a player of the game executing on the game system from a device of a non-player that is not currently participating in the game;

map an in-game identity of the player based on the messaging platform identity of the player; and send the message to the player via an in-game communications channel of the game system according to the in-game identity of the player.

2. The system of claim 1, wherein the messaging service is further configured to:
receive an outbound message for the non-player; and
send the outbound message to the non-player via the messaging platform.

3. The system of claim 2, wherein the outbound message is generated in response to an in-game event during the game.

4. The system of claim 2, wherein the outbound message is generated in response to a message request from the player via the in-game communications channel.

5. The system of claim 2, wherein the outbound message comprises a condition for the non-player when joining the game.

6. The system of claim 1, further comprising:
one or more computing devices that implement the game system configured to:
receive a join request from the non-player to join the game as another player of the game; and
apply the condition to the other player after joining the game.

7. The system of claim 1, wherein the messaging service is configured to:
map the non-player to an in-game identity of another player of the game; and
identify the non-player based on the in-game identity of the other player in the message delivered to the player.

8. The system of claim 1, wherein the messaging platform comprises one or more of a short message service (SMS) platform, a multimedia messaging service (MMS) platform, a Rich Communication Services (RCS) platform, an instant messaging (IM) platform, a Voice over Internet Protocol (VoIP) platform, or an email platform.

9. A method, comprising:
performing, by a messaging service for a game system implemented by one or more computing devices:
receiving, via a messaging platform, a message sent to a messaging platform identity of a player of a game executing on the game system from a device of a non-player that is not currently participating in the game;
mapping an in-game identity of the player based on the messaging platform identity of the player; and
sending the message to the player via an in-game communications channel of the game system according to the in-game identity of the player.

10. The method of claim 9, further comprising:
generating an outbound message for the non-player; and
sending the outbound message to the non-player via the messaging platform.

11. The method of claim 10, wherein the outbound message is generated in response to a message request from the at least one player via the in-game communications channel.

12. The method of claim 10, wherein the outbound message comprises a condition for the non-player when joining the game, the method further comprising:
receiving a join request from the non-player to join the game as another player of the game; and
applying the condition to the other player after joining the game.

13. The method of claim 9, further comprising:
mapping the non-player to an in-game identity of another player of the game; and
identifying the non-player based on the in-game identity of the other player in the message delivered to the at least one player.

14. The method of claim 9, wherein the messaging platform comprises one or more of a short message service (SMS) platform, a multimedia messaging service (MMS) platform, a Rich Communication Services (RCS) platform, an instant messaging (IM) platform, a Voice over Internet Protocol (VoIP) platform, or an email platform.

15. One or more non-transitory computer-readable storage media storing instructions that, when executed on or across one or more processors, cause the one or more processors to implement a messaging service for a game system, the messaging service configured to:
receive, via a messaging platform, a message sent to a messaging platform identity of a player of a game executing on the game system from a device of a non-player that is not currently participating in the game;
map an in-game identity of the player based on the messaging platform identity of the player; and
send the message to the player via an in-game communications channel of the game system according to the in-game identity of the player.

16. The one or more non-transitory computer-readable storage media of claim 15, wherein the messaging service is further configured to:
generate an outbound message for the non-player; and
deliver the outbound message to the non-player via the messaging service.

17. The one or more non-transitory computer-readable storage media of claim 16, wherein the outbound message is generated in response to an in-game event during the game.

18. The one or more non-transitory computer-readable storage media of claim 16, wherein the outbound message is generated in response to a message request from the at least one player via the in-game communications channel.

19. The one or more non-transitory computer-readable storage media of claim 15, wherein the outbound message comprises a condition for the non-player when joining the game, wherein the one or more computer-readable storage media further comprise instructions that, when executed on or across the one or more processors, cause the one or more processors to implement the game system configured to:
receive a join request from the non-player to join the game as another player of the game;
apply the condition to the other player after joining the game.

20. The one or more non-transitory computer-readable storage media of claim 15, further comprising instructions that, when executed on or across the one or more processors, cause the one or more processors to:
map the non-player to an in-game identity of another player of the game; and
identify the non-player based on the in-game identity of the other player in the message delivered to the at least one player.

* * * * *